Sept. 23, 1958 J. R. PARSONS 2,853,672
LOW FREQUENCY WELDING CONTROL
Original Filed Sept. 30, 1948 4 Sheets-Sheet 1

INVENTOR
John R. Parsons.
BY
Heyman Diamond
ATTORNEY

Sept. 23, 1958  J. R. PARSONS  2,853,672
LOW FREQUENCY WELDING CONTROL
Original Filed Sept. 30, 1948  4 Sheets-Sheet 2

WITNESSES:

INVENTOR
John R. Parsons.
BY
ATTORNEY

Sept. 23, 1958     J. R. PARSONS     2,853,672
LOW FREQUENCY WELDING CONTROL
Original Filed Sept. 30, 1948     4 Sheets-Sheet 3

WITNESSES:
John E. Heasley
Leon J. Taza

INVENTOR
John R. Parsons.
BY
ATTORNEY

Sept. 23, 1958  J. R. PARSONS  2,853,672
LOW FREQUENCY WELDING CONTROL
Original Filed Sept. 30, 1948  4 Sheets-Sheet 4

INVENTOR
John R. Parsons
BY
ATTORNEY

United States Patent Office 2,853,672
Patented Sept. 23, 1958

2,853,672

LOW FREQUENCY WELDING CONTROL

John R. Parsons, Pennsauken, N. J., assignor to Westinghouse Electric Corporation, East Pittsburgh, Pa., a corporation of Pennsylvania Original application September 30, 1948, Serial No. 52,103, now Patent No. 2,619,591, dated November 25, 1952. Divided and this application April 26, 1952, Serial No. 284,561

32 Claims. (Cl. 321—7)

This invention relates generally to electronic discharge apparatus and has particular relation to electronic timing systems for controlling supply of power from a source to a load by means of electronic discharge apparatus. In a specific embodiment the invention is applied to resistance welders for electronically controlling the transfer of current from a power source to a welding load.

This application is a division of my application Serial No. 52,103, filed September 30, 1948, now Patent No. 2,619,591, dated November 25, 1952, and assigned to Westinghouse Electric Corporation.

Resistance welders have, in the prior art, generally operated from commercial alternating current power lines, and have derived power from a single phase of such lines, despite the fact that power lines for industrial electricity are generally of the three phase variety. Such operation has generally been considered satisfactory for relatively low power welding.

As the thickness of material to be welded increases the power required for the welding operation likewise increases exponentially. Additionally, and especially in in the welding of steel, a reactive component of current is introduced into the welding load by the reactance of the secondary winding of the welding transformer linking with the steel being welded. The reactance of the secondary winding of the welding transformer becomes higher generally than the resistance of that winding, including the weld, so that the power factor of the welding load and consequently of the load drawn from the power line may become of the order of 25% or lower.

Still a further factor to be considered in welding extremely heavy materials, requiring extremely high welding current, relates to skin effect in the welding circuit due to the flow of alternating current in that circuit. One does not ordinarily consider skin effect to be significant at 60 cycles per second, but under the conditions of extremely high current and extremely low direct current resistance encountered in welding transformer secondaries, the resistance of the secondary is determined in considerable part by skin effect, and the resistance of the secondary circuit cannot, accordingly, be lowered indefinitely by ordinary engineering expedients, as, for example, by reducing the D. C. resistance of the circuit. Since the current required for welding is fixed, the kilowatt demand of the welding machine is proportional to the resistance of the secondary circuit of the welding transformer to alternating current, resulting in a high kilowatt demand.

Single phase welding has, accordingly, the following limitations:

(1) It causes unbalance of the three phase system from which power is drawn.

(2) It creates a high kilovolt ampere demand at low power factor.

It is extremely desirable to decrease the kilovolt ampere load required by a given welding equipment since thereby the cost of operation of the welder may be decreased, and further, since thereby the total cost of an installation designed to perform given welding functions may be decreased.

It is further extremely desirable that high power welders operate at high power factors and constitute a balanced three phase load, in order to enable economical operation of power transmission lines. In the commercial practice of selling power, further, it is usual to penalize users of power who do not operate at high power factor, or who unduly unbalance the transmission line. This represents an increased cost to the user of the welding equipment, and is obviously to be avoided.

When a current impulse of one polarity is applied to the primary winding of a single phase transformer, there is created in the iron core of the transformer a magnetic field which is proportional to the current until the iron saturates. While the magnetic field induced by current flowing in the primary winding is changing, a voltage is induced in the secondary winding of the transformer, and if the secondary winding is closed or completed, current flows in that winding. When the secondary current reaches its maximum value, the ratio of primary to secondary current is determined by the turns ratio of the transformer to a first approximation, and when the primary impulse ceases the secondary current decays. A succeeding current impulse may then be applied to the primary of the transformer in a direction opposite to the first impulse, so that two time adjacent impulses constitute in effect a low frequency cycle of current. By virtue of the technique briefly described immediately above, it is possible then to generate a low frequency alternating current by reversing at controlled times the direction of flow of current. Reduction of frequency of such current, when used for welding, reduces skin effect in the secondary of the welding transformer, since the latter depends directly upon frequency of current. This, in turn, raises the effective conductivity of the welding transformer secondary, and thereby the kilowatt demand made by the welding equipment. Furthermore, since reactance of the secondary winding likewise is determined by frequency, being directly proportional thereto, reduction of the frequency of the welding current reduces the reactance of the welding secondary and accordingly raises the power factor of the welding system.

It is further found, as an ancillary advantage, that the slow rise of welding current effected during low frequency welding causes the current to distribute itself in the welding more evenly than is the case when higher frequencies are used, resulting in better welds and obviating the difficulties caused by local heating or spitting.

The system of alternately reversing current welding above briefly described lends itself to operation from a three phase power line, deriving current equally from all the phases of the line, since voltage waves in the various lines of a three phase power system overlap in phase and, accordingly, super-position of half waves of current of one polarity in a single secondary, provides impulses of current of one polarity of an overlapping and substantially continuous character, each phase of the line providing current for 120° of each cycle. Provision for reversal of this current deriving from a three phase line, and control of the amplitudes of those currents, may comprise arc discharge devices, and specifically ignitrons, connected in inverse parallel pairs in each of the separate phases of the three phase lines, each ignitron being controlled by a firing tube, to which is applied firing signal, in accordance with a predetermined law or timing schedule, the timing schedule being adjustable to provide a wide range of different operations.

Timing arrangements may be provided both for controlling the over-all operation of the welding system, to enable sequencing of the complete welding operation, and also control of the on-off times of the ignitrons during welding, to provide a low frequency operation in selected and adjustable periods of current flow, that is, in alternately opposite directions for predetermined time intervals in each direction.

It follows that the development of three phase to single phase welding equipments wherein the single phase welding current is of low frequency, and is controllable in high degree in respect to frequency and magnitude, will lead to increased utility of high power welding equipment, leading particularly to economical operation and construction of welding equipment operating at extremely high power.

It is, accordingly, an object of the present invention to provide a novel system of electric welding.

It is a further object of the invention to provide an improved system of low frequency welding.

It is still a further object of the invention to provide an improved system of welding which utilizes the three phases of a three phase power line as a source of welding current.

It is another object of the present invention to provide an improved system of welding which establishes substantially an equal load on all the phase of a multi-phase line.

It is, more specifically, an object of the present invention to provide a system of welding which operates from a multi-phase line, wherein sequential pulsations of current of opposite polarity are employed for welding, the pulsations being derived equally from the various phases of the multi-phase line and flowing successively in opposite direction for precisely equal time intervals.

It is, broadly stated, an object of the present invention to provide a novel system for controllably transferring power from a multi-phase power supply to a single phase load.

It is a further broad object of the present invention to provide a novel system for controllably transferring power from a multi-phase power supply to a single phase load, by causing successive increments of current flow from successive phases of the line in a first direction for a controllable increment of time, and for thereafter reversing the direction of current flow in the load circuit and controlling said current to flow for a precisely like increment of time.

It is still a further object of the invention to provide a novel system of supplying alternating current to a load from a multi-phase alternating current source and from the separate phases of that source in equal amounts, in pulses having a lower frequency than the frequency of the source, the frequency of the current supply to the load being adjustable over a wide range of values.

Briefly described, in accordance with the present invention power is supplied to a single phase welding load over a three phase to single phase transformer, from a three phase line, a pair of back to back discharge valves, specifically ignitrons, being connected between each phase of the line and a primary winding of the three phase to single phase transformer for controlling and timing the transfer of power to the load.

The ignitrons are fired in conventional fashion by grid controlled firing valves, specifically thyratrons, the firing valves being supplied continuously with appropriate anode voltages from the three phase line, and being supplied with firing pulses from a welding timer, the presence and the timing of the firing pulses determining the times of firing of the firing valves, and consequently of the discharge valves or ignitrons, with respect to the phases of the voltages supplied to the discharge valves by the line. The discharge valves and their associated firing valves may be grouped for purposes of ready reference, each group containing one discharge valve of each of the back to back pairs and the valves of each group operating to transfer current in the same direction into the welding load. Accordingly, the discharge valves of one group fire in succession at 120° phase intervals until the operation of the group is discontinued by failure of application of firing pulses thereto. Thereafter firing pulses may be applied to the remaining group of discharge valves, which fire in succession, one after the other, until the operation of the remaining group is in its turn discontinued. The current flow deriving from each group of valves considered as a unit, from the time of initiation of current flow by a first valve of the group to the time of termination of current flow by the last valve of the group, constitutes, then, a half-cycle of low frequency welding current.

In systems of the above character, it is essential that the durations of alternate half cycles of low frequency welding current be of precisely equal duration. In practice, this requires that the same number of ignition tubes be caused to conduct for each half cycle of welding current. Any failure of equality of durations of half cycles of welding current results in an unbalanced current in the primary of the welding transformer, or otherwise considered, a D. C. component of current in the primary of the welding transformer, which in the course of a short interval of time saturates the transformer, and thereby renders the welding equipment inefficient or inoperative.

It is, of course, obvious that the ignitrons which provide current in the welding load in one direction must be adjusted to provide current of precisely the same magnitude as do the ignitrons which provide current for the opposite direction, since otherwise, despite the fact that the same number of ignitron tubes conduct for each half cycle of welding current the total welding current applied to the welding load or flowing in the primary of the welding transformer during alternate half cycles of welding current will not be equal and the transformer will saturate.

It is, accordingly, an object of the present invention to provide a system for postively equalizing the flow of welding current in opposite directions in a three phase to single phase welding system.

It is, more broadly described, an object of the invention to provide a system for preventing transformer saturation in three phase to single phase transfer of current from a three phase source to a single phase load.

Current flow in the welding load may be considerated to consist of alternate positive and negative pulses. In a three phase system, three ignitrons are allocated to production of positive pulses and three ignitrons to production of negative pulses, the ignitrons being connected in pairs across separate phases of the three phase line, in back to back relation, in a manner which is per se well known. Each of the ignitrons, moreover, is controlled in respect to its firing time by a thyratron tube which is connected with its anode to the anode of the associated ignitron and with the cathode of the thyratron in series with the ignitor electrode of the associated ignitron. Firing of the thyratron is controlled by means of a firing control pulse generator, which may itself be a further thyratron. The system thus envisages the use of control pulse thyratrons, one associated with each ignitron of the system, or, otherwise considered, the system, when energized from a three phase power line, envisages three control pulse thyratrons for controlling the positive pulses in the load, and three similar thyratrons for controlling the negative pulses in the load.

In accordance with the present invention, the control pulse thyratrons allocated to the positive pulses are caused to operate in sequence in units of three, firing of the first of the three thyratrons necessitating absolutely firing of the remaining two, in time sequence. The firing of the first of the thyratrons is accomplished in response to a control signal at a time following initiation of a welding cycle. Firing of the first control pulse thyratron results in application of a control pulse to the first firing thyratron, and accordingly results in firing of the first ignition. The control pulse which is communicated to the first firing thyratron is likewise applied to the second control pulse thyratron as a firing pulse therefor, and the latter, accordingly, fires when its plate voltage arrives at a proper value. The second control pulse thyratron, in firing, establishes a firing pulse for the second firing thyratron and also for the third control pulse thyratron. The latter in firing, establishes a firing pulse for the third firing ignitron, the cycle of operations then ceasing unless a further firing pulse is applied to the first of the control pulse thyratrons. The positive pulse of welding current may be made as long as desired by the simple expedient of continuing to supply the first of the control pulse thyratron with control pulses at the appropriate instants, and may be terminated at any time after the firing of the third control pulse thyratron by failing to supply the first control pulse thyratron with a firing pulse. The negative D. C. pulse is controlled in an identical fashion by a further group of three control pulse thyratrons, operation of which is initiated in response to a control pulse which may occur only after termination of a positive D. C. pulse in the load circuit, but which may be controlled to occur at various times thereafter, so that a gap may be established, which may be of predetermined duration, between positive and negative ones of the D. C. pulses of the welding frequency.

The firing tube control circuits, which, in accordance with the present invention, determine the time durations and time separations of the pulses of alternate polarity which constitute the welding current, allows, then, the conduction of the main ignitrons in groups of three only, and never less than three, and utilizes a single pulse to control the conduction of each group of three ignitrons. The control pulse thyratrons may be energized over a phase shifting circuit, which may be utilized to determine the phase position with respect to the phase of the supply voltages at which the firing of the ignitrons may take place, and this position may be varied readily by adjustment of the phase shifting device.

The function of timing the duration of the welding cycles and the interval therebetween is accomplished by means of a frequency control circuit which may be briefly described as follows:

The frequency control circuit in accordance with the present invention involves four gaseous conduction devices, or thyratrons, all of which operate in parallel from a single phase of the three phase power line which provides power for the welding circuit. Of the four tubes, a first is maintained conductive normally, and is connected in series with two resistors, the latter being in parallel with one another and each being shunted by a timing condenser. While the thyratron is conductive, then, the series connected resistors each develop a voltage, the voltages being separately utilized for rendering the second and third electronic discharge devices non-conductive. When the first electronic device ceases to be conductive, on the other hand, the charges developed in the condensers connected across the parallel resistors discharge through the resistors, respectively, maintaining continually decreasing voltage drops across each of the resistors, which, when sufficiently decreased, serve to render the second and third electronic discharge devices conductive.

The fourth electronic discharge device is normally maintained non-conductive by means of a self-biasing circuit but is rendered conductive in response to initiation of weld time. In circuit with the fourth thyratron is connected a first pulsing transformer which generates the control pulses hereinbefore referred to, these latter having the function of initiating flow of a half cycle of welding current between the phases of the three phase power line and the welding load.

In series with the fourth thyratron is a parallel resistance and condenser combination, the condenser acquiring full charge immediately when the fourth thyratron ignites. The condenser is connected with the first thyratron in such manner as to bias the latter off when the condenser is charged. Accordingly, the firing of the fourth thyratron terminates firing of the first thyratron and initiates the timing operation of the timing circuits connected in series therewith.

After a predetermined time, which equals in the present embodiment of my invention, two cycles of the supply frequency, the first of the two timing circuits discharges sufficiently to enable firing of the second thyratron. Firing of the latter terminates firing of the fourth thyratron and thereby terminates generation of control pulses, and thereby flow of current from the power line to the welding load in one direction.

The second timing circuit is adjusted to require three cycles of the supply frequency for decay of its charge to a value sufficiently low to enable firing of the third thyratron. The latter contains in circuit therewith a pulsing transformer for generating control pulses for enabling transfer of current between the power line and the welding load in a direction opposite to that controlled by the fourth thyratron. The third thyratron, accordingly, now commences to fire and is permitted to fire for two cycles of the supply frequency. At the end of that time, the condenser of the timing circuit connected in series with the fourth thyratron, which is now non-conductive, discharges sufficiently so that the voltage thereacross is sufficiently low to again permit firing of the first thyratron. The firing of the first thyratron immediately generates off biasing voltages in the two timing circuits in series therewith, and cuts off the second and third thyratrons. Cutting off the third thyratron terminates transfer of current between the power line and the welding load in the second direction, while biasing off the second thyratron removes hold-off bias from the fourth tube and permits the latter again to conduct, initiating a further cycle of control pulses.

The fourth thyratron is provided with two control electrodes, one of which serves as an off bias control in response to current flow in the second thyratron, while the remaining control electrode is controlled from the welding sequence timer in response to initiation of weld time. Accordingly, the cycle of operations described immediately above continues until termination of weld time, in response to which the second control electrode of the first thyratron is provided with off bias voltage and the cycle of operation terminates.

It will be realized that it is essential for proper operation of the present system that a welding current cycle be not interrupted prior to its normal completion time, in order to avoid saturation of the welding transformer. Weld time, in accordance with the present invention, is controlled by a weld time thyratron in series with a weld time delay relay. Firing of the thyratron energizes the relay and effects closure of circuit contacts which are adapted and arranged to terminate the weld time period. Timing of the welding period is accomplished independently of the timing of the separate half cycles of welding current, and by a separate timing circuit, so that there is no assurance that a welding period will end only at the termination, or after the termination of a cycle of welding current, in the absence of special precautions to that end.

In accordance with the present invention, therefore, the voltage established across the timing circuit which is in series with the fourth thyratron, and which subsists for the duration of each welding cycle, and decay of which to a predetermined value signals termination of each cycle of welding current, is applied to an auxiliary control electrode contained in the weld time thyratron, and serves to prevent firing of the latter despite termination of normal weld time until after completion of a cycle of welding current.

It is, accordingly, a further object of the present invention to provide a novel timing system for preventing termination of a welding period except after the termination of a cycle of welding current, thereby to establish flow of welding current in complete cycles only.

The novel features which I consider to be characteristic of my invention are set forth with particularity in the appended claims. The invention itself, however, both as to its organization and its method of operation, together with additional objects, advantages and novel features thereof, will best be understood from the following description of a specific embodiment thereof, especially when read in connection with the accompanying drawings, wherein:

Figures 1, 2 and 3, inclusive, taken together, provide a circuit diagram of an embodiment of the invention; and wherein, Figure 1 of the drawings illustrate the arrangement of a plurality of gaseous conduction devices with respect to the phases of a multi-phase power line, for the purpose of controllably transferring current from the power line to a single phase load;

Figure 1:
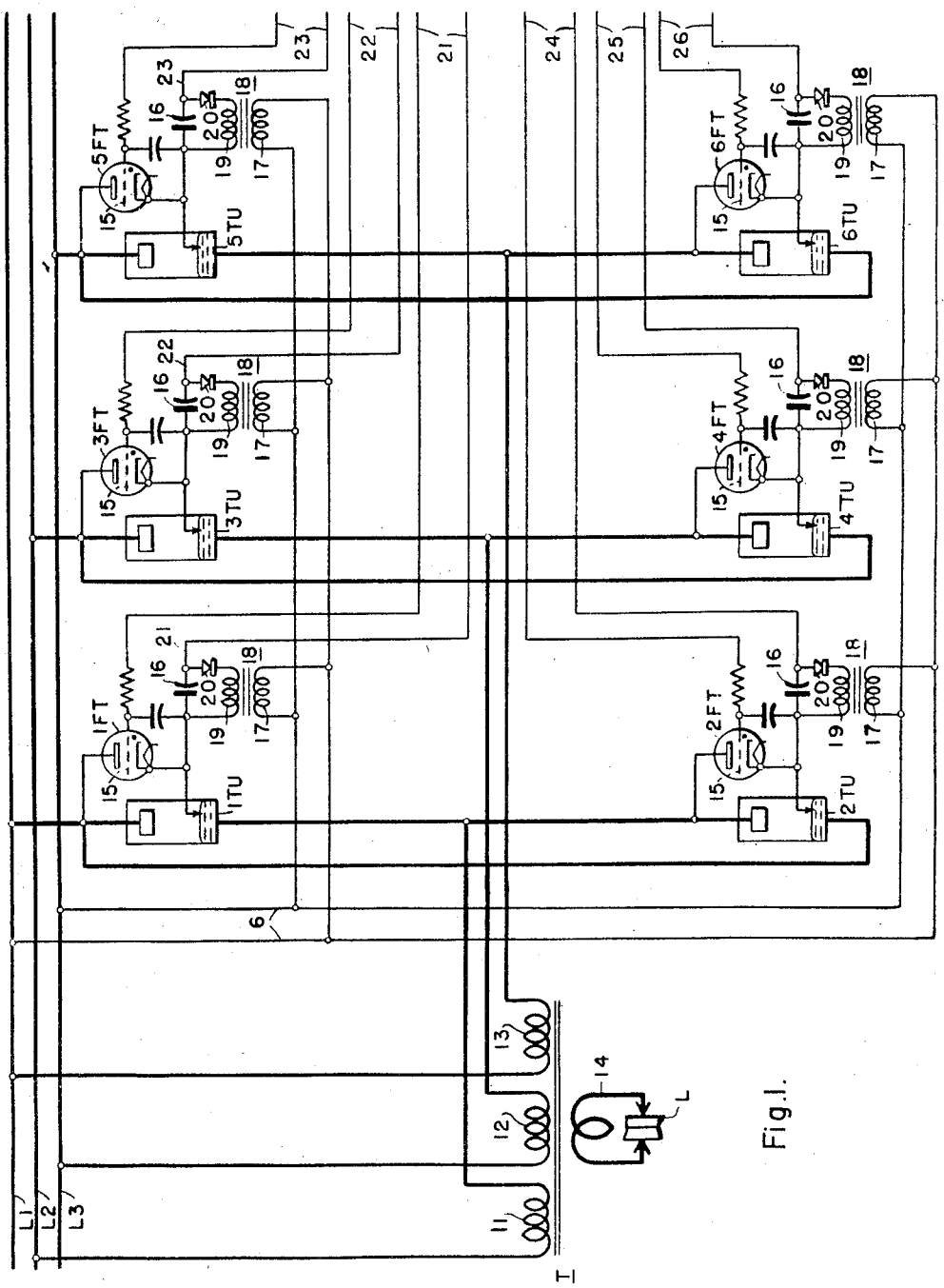

Referring now to Figure 1 of the drawings, the reference numerals L1, L2 and L3 identify the lines of a three phase power source, the separate phases of which supply power to ignitrons 1TU and 2TU, 3TU and 4TU, 5TU and 6TU, arranged in back to back pairs, one pair across each phase of the source, and each pair supplying power to a separate one of primary windings 11, 12, 13 of a transformer T, the single secondary winding 14 of which supplies power to a welding load L.

Each of the ignitrons 1TU to 6TU, inclusive, is controlled by a thyratron firing tube, the respective thyratron firing tubes, identified by the designations 1FT through 6FT, being connected each in series between the anode and the igniting rod of an associated ignitron, so that firing of any thyratron initiates firing of the associated ignitron.

The control electrodes 15 of the firing tubes 1FT through 6FT are normally maintained biased back beyond the critical potential at which firing of the thyratrons may take place, by means of a D. C. voltage established at each of the firing tubes across a condenser 16. D. C. voltage is established across each of the condensers 16 by rectifying a voltage derived across the lines L1, L3, and applied via lines 6 to the primaries 17 of the transformers 18, having secondaries 19 connected in series with the condensers 16 via rectifying unit 20. Firing pulses are supplied to the firing tubes 1FT, 3FT and 5FT via lines 21, 22 and 23 respectively, and to firing tubes 2FT, 4FT and 6FT via lines 24, 25, 26 respectively, the firing tubes, in the absence of firing pulses supplied over the appropriate ones of lines 21 through 26, inclusive, being cut off, thereby cutting off the associated ignitrons 1TU through 6TU, and preventing transfer of current to the welding load L.

It will be clear, then, that any one of thyratrons 1FT through 6FT, inclusive, and hence any one of ignitrons 1TU through 6TU, inclusive, may be caused to fire by transferring an appropriate firing pulse of suitable polarity and magnitude, over the appropriate one of lines 21 through 26, inclusive, while the anode of the ignitron is positively polarized. The firing of any one of ignitrons 1TU, 3TU, 5TU will transfer to the load L a current of one polarity, which may for purposes of convenience in explaining the present invention be denominated positive, and transfer of current via any one of ignitrons 2TU, 4TU, 6TU will correspondingly cause flow of current in the load L in a direction opposite to the positive direction, and which may, therefore, be denominated negative.

It will be realized that the utilization of ignitrons and thyratrons in the present invention involves a matter of choice of circuit elements, and that other types of electronic discharge devices may be employed in practicing the invention without departing from the true spirit thereof. Valves 1FT through 6FT will be referred to hereinafter as firing valves for the sake of generality, since these valves serve to initiate firing of the ignitrons. The ignitrons themselves may be referred to as such, or in the alternative as arc discharge devices or valves, it being their sole function to pass current to the welding load at times determined by the firing tubes 1FT through 6FT, and in particular, whenever the latter are firing. It will, accordingly, be evident that thyratrons or other gaseous conduction devices may be substituted for the ignitrons 1TU through 6TU, especially for operating into relatively light welding loads, and that hard or purely electronic valves may be utilized in place of the thyratrons 1FT through 6FT if the required firing current is of sufficiently low value.

Figure 2:
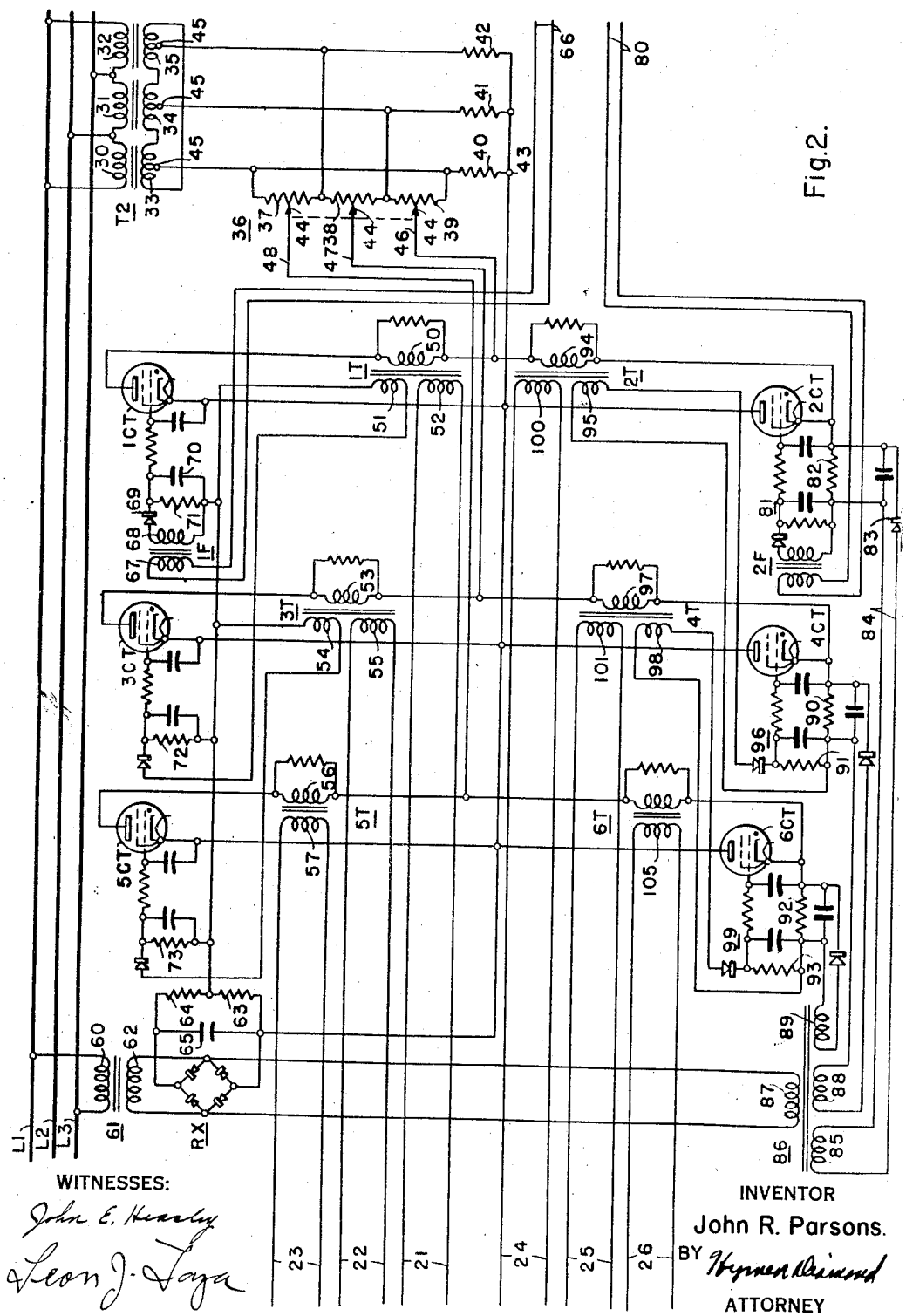
Figure 2 represents in schematic circuit diagram a control pulse generating circuit for controlling the successive transfer of current pulses between the separate gaseous conduction devices of Figure 1 to a single phase load, at controlled times and for controlled periods.

Reference is now made to Figure 2 of the drawings wherein is illustrated schematically the circuit which develops control pulses for establishing firing times for the firing tubes 1FT through 6FT. Alternating current anode potential for the control tubes 1CT through 6CT is supplied over the three phase line L1, L2 and L3 via a transformer T2 having one primary winding 30 connected between lines L1 and L2, a second primary winding 31 connected between lines L2 and L3 and a third primary winding 32 connected between lines L1 and L3. The primaries of the transformer T2 accordingly are connected in delta with the three phase line L1, L2, L3. The secondary windings of the transformer T2, identified respectively by the numerals 33, 34 and 35, which are associated in the order named with the primaries 30, 31 and 32, respectively, are likewise connected in delta. Across the secondaries 33, 34 and 35 is a phase shift device generally denominated by the reference numeral 36, and which consists of three mechanically ganged potentiometers 37, 38 and 39 connected in delta with respect to the secondary windings 33, 34 and 35 of the transformer T2. Connected across the potentiometer 36 are three resistances 40, 41 and 42, which are connected in wye, thereby establishing a neutral point 43 for the three phase system. The phase of the potentials established across the resistance 40, 41 and 42 with respect to the neutral point 43 may be varied by varying the movable contact 44 of the potentiometer 36, since the junction points between the potentiometers 37, 38 and 39 are connected to midpoints 45 of the secondary windings 33, 34 and 35 respectively of the transformer T2.

Three lines 46, 47 and 48 emanate from the variable taps 44 of the potentiometers 37, 38 and 39. The voltages on the lines 46, 47 and 48 are mutually displaced by a phase angle of 120°, since these voltages originate in the three phase lines L1, L2 and L3, and the potentials on the lines 46, 47 and 48 assume their positive maxima in succession, in the order in which the lines have been named. The phases of the voltages in the lines 46, 47 and 48 with respect to the voltages in the power lines L1, L2 and L3 may be shifted by shifting the contacts 44, these contacts being ganged to assure that any variation of phase which is introduced into one of the lines 46, 47 and 48 is likewise introduced into the remaining ones of these lines.

The line 46 supplies anode potential to the control tube

1CT via the primary winding 50 of a control transformer 1T having two secondary windings 51 and 52. The line 47 likewise leads to the anode of the control tube 3CT via the primary winding 53 of a control transformer 3T having two secondaries 54 and 55. Line 48 supplies anode potential to the control tube 5CT via the primary winding 56 of a control transformer 5T. While the tubes 1CT, 3CT and 5CT are supplied with anode potential continuously, in phases which lag in succeeding ones of the tubes by 120°, the tubes are normally cut off, and prevented from firing, by means of a bias potential applied to the control electrodes thereof from a rectifier unit RX, to which is applied alternating current deriving across lines L1, L3 via a primary winding 60 of a transformer 61 having a secondary winding 62. The secondary winding 62 of transformer 61 is connected across two diagonally opposite terminals of the rectifier unit RX, and D. C. output potential is taken from the remaining two diagonally opposite terminals of the rectifier RX, and applied across a pair of series connected resistors 63, 64 across which is shunted a smoothing condenser 65. The mid-point of the resistors 63, 64 is connected with the control electrodes of the control tubes 1CT, 3CT, 5CT, in parallel, and the remaining terminal of the resistance 63 is connected with the cathodes of the control tubes 1CT, 3CT, 5CT in parallel. Potential developed across the resistance 63 is utilized to establish a negative potential on the control grids of the tubes 1CT, 3CT and 5CT, which, in well known manner, prevents these tubes from firing regardless of the potentials which may be impressed on the anodes of the tubes.

Firing potential is applied to the control tubes 1CT, 3CT and 5CT in a manner now to be described. Considering first the tube 1CT, firing potential is applied to this tube over a pair of lines 66 in the form of a pulse, derivation of which will be described hereinafter. The occurrence of a firing pulse on the line 66 initiates a cycle of operation of the control tubes 1CT, 3CT and 5CT, and consequently, as will be hereinafter described, of the ignitrons 1TU, 3TU and 5TU. Occurrence of a pulse on the line 66, accordingly, signals initiation of a welding cycle. The pulse applied on the line 66 is applied to the primary 67 of a transformer 1F, having a secondary winding 68 which is connected with the control electrode of the control tube 1CT via a rectifying unit 69, there being connected across the secondary winding 68 and the rectifying unit 69, taken in series, a parallel combination of resistance 71 and condenser 70. The rectifier unit 69 rectifies the pulse supplied via the transformer 1F charging the condenser 70 in such sense as to render the control electrode of the control tube 1CT positive to an extent sufficient to establish ionization of the gas in the tube 1CT and consequently firing of the latter when the anode of the control tube 1CT goes positive. The time constant of the combination of condenser 70 and resistance 71 is sufficiently short to allow rapid decay of the charge of the condenser 70 after initiation of firing of the tube 1CT. The timing of the firing pulse established on the control electrode of the tube 1CT is synchronized in respect to the anode potential applied to the same tube, since the control pulse applied to the tube 1CT is derived from the same phase of the lines L1, L2, L3 as is the anode potential for the tube 1CT. The relative phase of the firing pulse applied to the control electrode of the control tube 1CT with respect to the anode potential applied to the tube 1CT is, of course, variable since the firing pulse occurs at a fixed time with respect to the voltage established on the supply lines L1, L2 and L3, while the anode potential applied to the control tube 1CT is applied to the latter via a phase shifting network 36, the latter being advanced by a variable time with respect to the timing of the firing pulse.

Firing of the tube 1CT establishes a pulse of current in the primary winding 50 of the transformer 1T, this pulse being transferred, first, via the secondary 51 of the transformer 1T to the grid pulsing circuit 72 of the control tube 3CT, which is in all respect identical with the grid pulsing circuit illustrated in conjunction with the tube 1CT, the operation of which has been described hereinbefore. The pulse applied via the secondary winding 51 accordingly is rectified and applied to the control electrode of the control tube 3CT, establishing a firing time for that tube. Anode potential for the tube 3CT is supplied thereto over the line 47 and the primary winding 53 of the transformer 3T.

Accordingly, the control tube 3CT will conduct current at a time following the firing of the tube 1CT, this time being established by the time of application of positive potential to the anode of the control tube 3CT. Firing of the tube 3CT establishes a pulse of current in the primary winding 53 of the transformer 3T, which is transferred via the secondary winding 54 of the transformer 3T to pulsing circuit 73 of the control electrode of the control tube 5CT, the latter pulsing circuit again being identical with the pulsing circuit 72 and establishing a pulse voltage for application to the control electrode of the control tube 5CT.

Application of positive control pulse to the control electrode of the control tube 5CT establishes current flow in the latter when the anode potential of the latter becomes positive, anode potential being applied to the control tube 5CT via the line 48 and the primary winding 56 of the transformer 5T. The pulse of current established in the primary winding 56 is not re-transferred back to the first one of the control tubes, 1CT, but the sequential operation of the control tubes 1CT, 3CT and 5CT now terminates, unless a further control pulse is applied to the primary winding 67, and the transformer 1F, via the line 66. Should such a further control pulse be established a further firing sequence will occur, the tubes 1CT, 3CT and 5CT firing in sequence in a further cycle of operation, duplicating the sequence of operations above described.

Associated with the primary winding 50 of the transformer 1T is a secondary winding 52 which is connected via the lead 21 with the control electrode and cathode of firing tube 1FT which determines the time of firing of the ignitron 1TU, establishing a firing potential on the control electrode of the tube 1FT at a proper time to enable firing of the tube, that is, while the anode of the tube 1FT is positive. Firing of the tube 1FT establishes a pulse of current through the ignitor electrode of the ignitron 1TU, which establishes firing of the ignitron 1TU, enabling transfer of a pulse of current to the welding load L via the primary winding 11 and the secondary winding 14 of the transformer T.

When the control tube 3CT fires, likewise, the pulse of current in the primary winding 53 of the transformer 3T transfers voltage to the secondary winding 55 of the transformer 3T, the pulse of voltage being applied via the line 22 to the control electrode of the firing tube 3FT, which in turn establishes a firing time for the ignitron 3TU, and consequently a positive pulse of current in the welding load L, via the primary winding 12 of the transformer T, and the secondary winding 14 of the latter.

Firing of the control tube 5CT likewise establishes a pulse in the primary winding 56 of the transformer 5T, which is translated into a voltage pulse in the secondary winding 57 of the latter, this voltage pulse being transferred via the line 23 to the control electrode of the firing tube 5FT, which thereupon fires and establishes firing of the ignitron 5TU. The latter, in turn, transfers a positive pulse to the welding load L via the primary winding 13 of the transformer T, and the secondary winding 14 thereof.

In summary then, each transfer of a pulse to the line 66 establishes a sequential operation of the control tube 1CT, 3CT and 5CT, the latter providing control pulses in sequence to the firing tubes 1FT, 3FT and 5FT, which cause firing of the ignitron 1TU, 3TU and 5TU, in sequence, and with phase separation of 120°, thereby to establish a positive pulse in the welding load for a time equal to 360° of the supply frequency. The system then requires and enforces firing of the ignitrons 1TU, 3TU and 5TU in groups of three, in response to the application of a single control pulse on the line 66, and the firing sequence of the ignitrons 1TU, 3TU and 5TU cannot be interrupted or disestablished, once it has been initiated, until all three ignitrons have been fired. One or more sequences of operation may be initiated in like manner by application of succeeding control pulses to the line 66, and interruption of welding current may be accomplished at any time after completion of a complete firing sequence of the ignitrons 1TU, 3TU, 5TU, by failure to supply a control pulse to the line 66.

The control tubes 2CT, 4CT and 6CT operate in a manner entirely similar to that described above as applying to the control tubes 1CT, 3CT and 5CT, initiation of firing of the tubes 2CT taking place in response to application of a control pulse to the lines 80, which establishes a firing control voltage in the control electrode circuit of the control tube 2CT, to which is normally applied a negative off-biasing potential established across the resistance 82 by rectification in the rectifier unit 83 of alternating current supplied over the line 84 from the secondary winding 85 of a transformer 86 having a primary winding 87, which is, in turn, connected across the secondary winding 62 of the transformer 61. The transformer 86 includes two additional secondary windings 88 and 89, which are utilized to establish, in a like manner, off biasing potentials for the control electrodes of the control tubes 4CT and 6CT, the control tube 4CT including in its grid circuit a resistor 90 connected in series with rectifier unit 91 and with the secondary winding 88 of the transformer 86, and the control electrode of the control tube 6CT containing in circuit a bias resistance 92 connected in series with a rectifier unit 93 and with the secondary winding 89 of the transformer 86.

Connected in series with the cathode circuit of the control tube 2CT is a primary winding 94 of a transformer 2T, the latter having a secondary winding 95 which is connected with the control electrode circuit of the control tube 4CT by means of a pulse rectifying circuit 96, which is identical with the pulse rectifying circuit associated with the control tube 1CT, and with the pulse rectifying circuit associated with the control circuit 81 associated with the tube 2CT, and which has been described in detail hereinbefore. Accordingly, firing of the tube 2CT is followed by firing of the tube 4CT, upon establishment thereat of a suitable positive anode potential. There is likewise connected in the cathode circuit of the tube 4CT primary winding 97 of a transformer 4T, a secondary winding 98 of which is applied to the input circuit 99 of the control tube 6CT, the latter being identical with the control circuits 96 and 81 associated with the control tubes 4CT and 2CT, respectively. Accordingly, firing of the tube 4CT is accompanied by application of a firing pulse to tube 6CT, which fires when the anode potential thereof attains a suitable positive value.

Firing of the control tube 6CT terminates the firing cycle of the tubes 2CT, 4CT and 6CT unless a further control pulse is applied over the line 80 to the input transformer 2F of the control tube 2CT.

Included in the transformer 2T is a secondary winding 100 which, in response to a current pulse in the primary winding 94 of the transformer 2T, translates a voltage pulse via the line 24 to the firing tube 2FT associated with the ignitron 2TU, establishing a firing time for the latter upon firing of the firing tube 2FT.

Associated with the transformer 4T, which is connected in the cathode circuit of the control tube 4CT is a secondary winding 101, which transfers a voltage pulse via the line 25 to the circuit of the control electrode of the firing tube 4FT, which fires in response to the voltage pulse, and in firing causes firing of the ignitron 4TU. Similarly, a secondary winding 105 is magnetically coupled with the primary winding of the transformer 6T, which is connected in series with the cathode circuit of the control tube 6CT, so that firing of the control tube 6CT accomplishes transfer of a voltage pulse via the line 26 to the firing tube 6FT, which breaks down in response to a control pulse established on the line 80, the control tubes 2CT, 4CT and 6CT break down in sequence, transferring firing pulses to the firing tubes 2FT, 4FT and 6FT in sequence, and these latter, in firing, accomplish firing of the associated ignitrons 2TU, 4TU and 6TU in similar sequence, applying overlapping negative pulses of potential to the negative load L via the primary windings 11, 12 and 13 of the welding transformer T. The ignitrons 2TU, 4TU and 6TU accordingly fire in sequence, in groups of three, in response to a single control pulse applied to the leads 80, and successive firing sequences take place only in response to successive applications of pulses to the line 80, firing terminating after firing of the tube 6TU, unless a further firing sequence is initiated.

Figure 3:
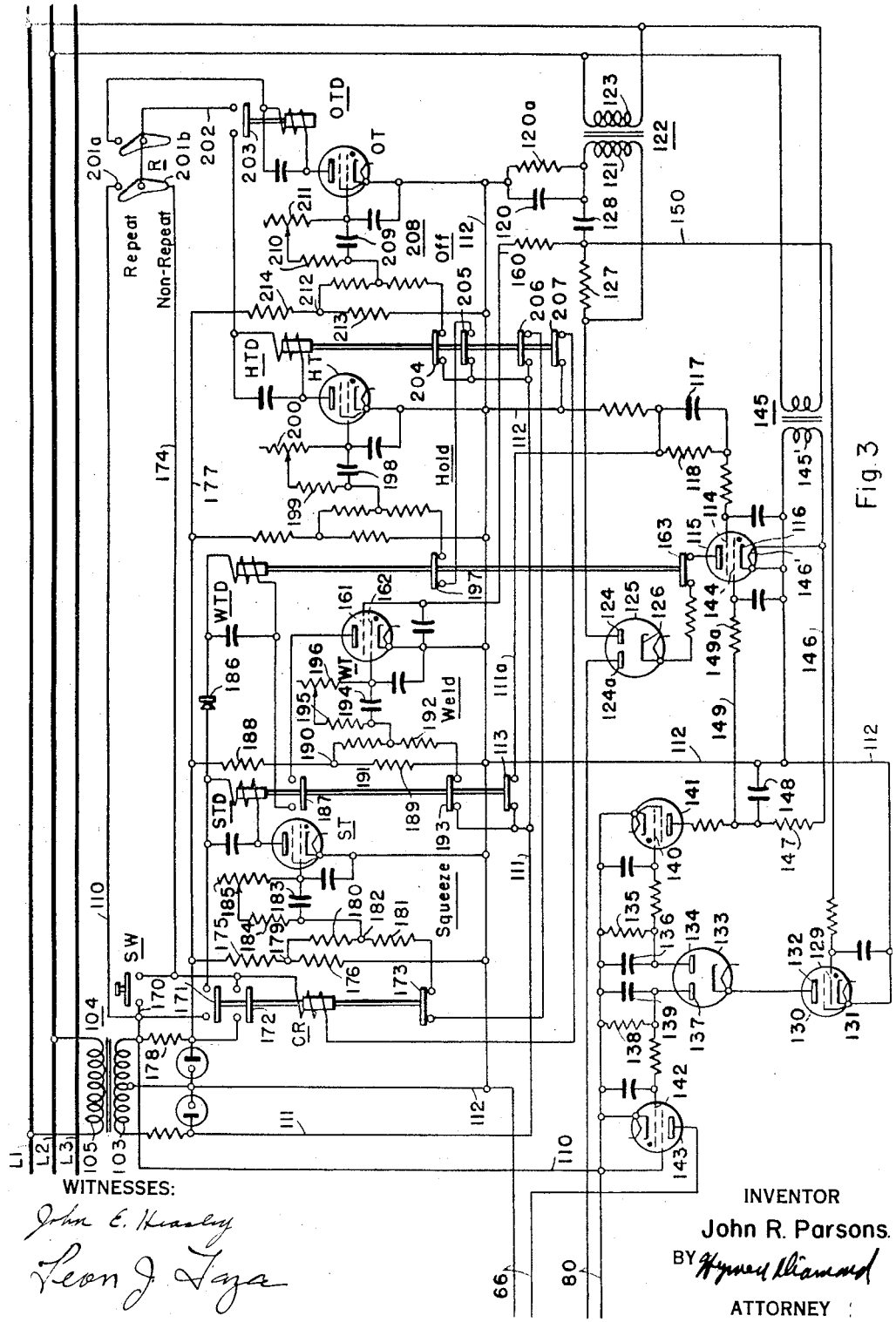
Figure 3 illustrates in schematic circuit diagram a frequency control circuit for determining the duration and the time separation between separate direct current pulses, following each other alternately in opposite direction in the welding load and a welding sequence timer arranged in accordance with the invention.

We now consider the manner in which control pulses are established for application to the lines 66 and 80. Referring specifically to Figure 3 of the drawings, there is disclosed a circuit diagram of an apparatus adapted for providing control pulses to the firing pulse generator circuit of Figure 2 of the drawings. Power for the control pulse generating circuit is supplied from three lines 110, 111 and 112, which are connected respectively with opposite ends and with a center tap of a secondary winding 103 of a transformer 104, the primary of which is connected between lines L1 and L2 (see Figure 3).

Upon initiation of a welding sequence and in accordance with the well known practice in the art, the welding electrodes are clamped to the work for a predetermined time known as "squeeze time" before current is transferred through the weld by the welding transformer. In the present embodiment of my invention, during squeeze time, the line 111a is closed via the normally closed contact 113. Accordingly the auxiliary control electrode 114 of the thyratron 115 is supplied with operating voltage of alternating current in character, driving the potential of the control electrode 114 alternatively above and below the potential of the cathode 116 of the thyratron 115, the latter being established by the lead 112. Capacitor 117, connected in circuit with the control electrode 114, accordingly charges by grid rectification in such polarity as to maintain the control electrode 114 negative with respect to the cathode 116 of the thyratron 115, serving thereby to maintain the thyratron 115 in unfired condition. With the termination of squeeze time, the contacts 113 are opened removing potential from the line 111a. There is then no voltage available for charging the condenser 117 by grid rectification, and the condenser 117 discharges through the resistor 118 shunted thereacross, placing the thyratron 115 in firing condition upon application to the anode thereof a suitable value of positive voltage.

Figure 4:
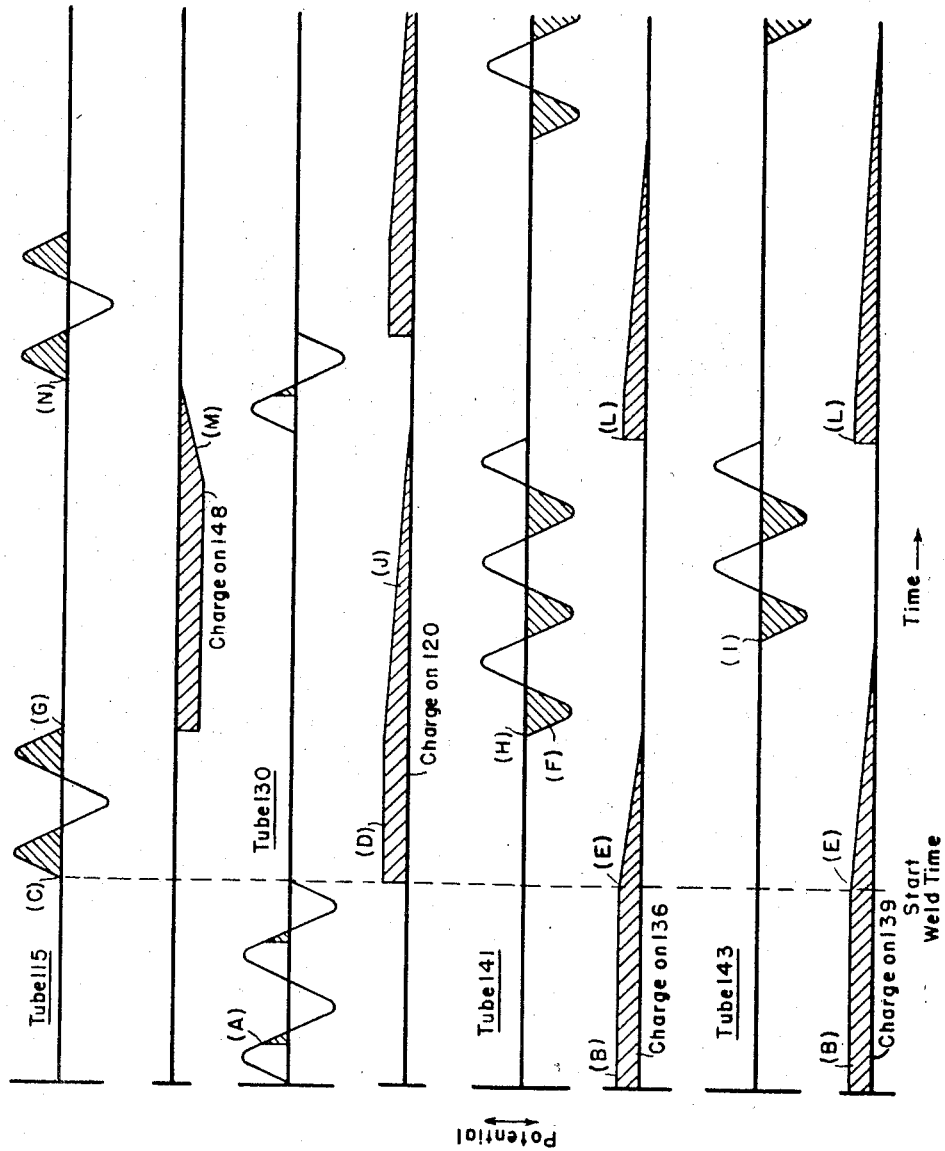
Figure 4 is a timing sequence or flow sheet illustrating the time of firing of the various electronic control tubes illustrated in Figure 3, as well as the action of various timing circuits associated with these electronic control tubes.

Reference is made to Figure 4 of the drawings wherein there is provided a timing diagram by reference to which the operation of the system of Figure 3 may be clarified. In Figure 4 operations take place in a time sequence proceeding in alphabetical order, cross hatched portion of the diagram representing tube conduction, or condenser charge and decay, as the case may be. The alphabetical designations which appear in the following description refer to various portions of the curves shown in Fig. 4.

So long as the thyratron 115 is in unfired condition the condenser 120 contains no charge, and consequently no voltage exists thereacross. The condenser 120 can be charged only via a circuit including the secondary winding 121 of a transformer 122, having a primary winding 123 connected across lines L1 and L2, this secondary winding being connected furthermore, to one anode 124 of double diode 125 having a cathode 126, in the cathode circuit of which is connected the thyratron 115. Connected in series across the secondary winding 121 of the transformer 122 is a resistance 127 and a condenser 128, which together provide a phase shifting circuit for the voltage established across the secondary winding 121, phase shifted voltage being available at the terminal point of connection between the resistance 127 and the condenser 128, and this voltage being applied to the control electrode 129 of a thyratron 130. Cathode 131 of the thyratron 130 is connected directly with the line 112. The anode 132 of the thyratron 130, on the other hand, is connected in the cathode circuit of a double diode 133, having one anode 134 which is connected with the line 110 via a parallel combination of resistance 135 and condenser 136.

It will be recalled that the lines 110, 111 and 112 are energized from across the lines L1 and L2, as is also the transformer 122. Accordingly, the phase of the voltage applied to the anode 134 of the diode 133, as well as to the anode 132 of the thyratron 130, is in phase with the voltage applied to the primary winding 123 of the transformer 122. Firing voltage applied to the control electrode 129 of the thyratron 130, however, is derived from the phase shifting circuit comprising resistance 127 and condenser 128, and firing voltage accordingly lags behind anode voltage at the thyratron 130, causing firing of the latter (A) late in the anode potential cycle. The double diode 133 comprises a further anode 137, which is connected with the line 110 over a parallel connected combination of resistance 138 and condenser 139. Since the thyratron 130 fires once in each cycle of the potential applied across the lines 110 and 112, the condensers 136 and 139, connected respectively in the anode circuits 134 and 137 of the double diode 133, charge, (B) establishing negative potentials at the anodes 134 and 137, which are applied respectively to the control electrode 140 of the thyratron 141, and to the control electrode 142 of the thyratron 143, maintaining the thyratrons 141 and 143 in cut-off condition.

It will be clear then, that while the contacts 113 are closed thyratron 130 is firing, but that thyratrons 141, 115 and 143 are maintained in cut-off condition. (See Figure 4.) Upon opening of the contacts 113, which signals initiation of weld time as has been mentioned hereinbefore, the charging voltage for the condenser 117 is removed, and the latter rapidly discharges through the associated parallel connected resistor 118, attaining a potential such that the control electrode 114 of the thyratron 115 may fire upon application thereto of suitable anode potential, assuming establishment, initially, of a suitable firing voltage at the control electrode 144 of the thyratron 115.

Firing potential for the control electrode 144 is obtained over a phase shifting circuit which is energized from the secondary of the filament transformer 145, which otherwise provides heating current for the cathode 116 of the thyratron 115. The secondary winding 145' of the filament transformer of the thyratron 115 is connected via a lead 146 and a resistor 147 to one terminal of a condenser 148, the other terminal of which is connected with the line 112, and the first mentioned terminal of the condenser 148 is further connected via a lead 149 and over a resistance 149a with the control electrode 144. The remaining terminal of the secondary winding 145' of the filament transformer for the thyratron 115 is tied directly to the line 112. Accordingly, energization of the filament 146 effects establishment across the condenser 148 of an alternating voltage phase shifted ahead of the anode voltage applied to the anode of the thyratron 115, phase shifting occurring by virtue of the traverse of a current proportional to filament voltage through the resistance 147, and the condenser 148 in series, the potential across the condenser 148 leading the current passing therethrough in accordance with principles which are per se well known.

Firing of the thyratron 115 (C) enables transfer of current in the double diode 125, potential for the anode 124 of which is provided by the secondary winding 121 of the transformer 122, and hence transfer of control pulses over leads 80, via anode 124a of double diode 125. Passage of current via the section of the double diode 125 comprising the anode 124 results in charging (D) of the condenser 120, the negative terminal of which is connected via the secondary winding 121a, resistance 127 and the lead 150, with the control electrode 129 of the thyratron 130, biasing the latter off and initiating thereby discharge (E) of the condenser 136 over the resistance 135, and of the condenser 139 (E) over the resistor 138. The relative rates of decay in the condensers 136 and 139 are so established that the condenser 136 discharges the more rapidly, so that firing potential is introduced to the control electrode 140 of the thyratron 141 (F) by one full cycle ahead of the time that firing potential is introduced from the anode 137 of the doubel diode 133 to the control electrode 142 of the thyratron 143. Accordingly, the thyratron 141 conducts before the thyratron 143 conducts. Firing of the thyratron 141 results in charging of the condenser 148, the negative terminal of the condenser 148 being connected with the control electrode 144 of the thyratron 115. Accordingly, the thyratron 115 is cut off (G) at a time determined by the discharge time of the condenser 136. In the present embodiment of my invention, discharge time of the condenser 136 is so established that after transfer of two cycles of alternating current through the thyratron 115, the potential of the control electrode 140 of the thyratron 141 is raised sufficiently to enable firing (H) of that tube, which establishes cut-off bias thyratron 115 across condenser 148 without delay, so that the thyratron 115 is provided with time for passing a total of two cycles of alternating current.

It will be recalled that the condenser 139 discharges (E) more slowly than does the condenser 136, and specifically that the condenser 139 discharges to an extent sufficient to enable firing of the thyratron 143 at a period one cycle after firing of the thyratron 141. Accordingly, after the thyratron 141 is fired and the thyratron 115 has been cut off, one further cycle of alternating voltage occurs and then the condenser 139 having sufficiently discharged, the thyratron 143 fires (I) establishing pulses of current on the line 66.

While the thyratron 143 is passing pulses of current, the thyratron 115 remains cut off. Since the thyratron 115 is now not conducting current, the condenser 120 is not being charged and the charge existing on the condenser slowly leaks off (J) via the associated resistor 120a which is connected in shunt with the condenser 120. Discharge time for the condenser 120 is established at three cycles of the supplied frequency. After the condenser 120 has sufficiently discharged, i. e. in a time equal to three cycles of the supply frequency, the thyratron 130 is no longer biased off, and again fires, rapidly charging the condensers 136(L) and 139(L) and cutting off thyratrons 141 and 143.

The circuit illustrated in Figure 3 of the drawings is now in its original condition, and if the welding cycle has not been terminated the condenser 117 remains uncharged, since the contacts 113 remain open. The thyratron 141 being now blocked, the condenser 148 which provides hold-off bias for the thyratron 115 discharges (M). Upon discharge of condenser 148, which requires a time equal to one cycle of the supply frequency, the thyratron 115 again discharges (N), and the entire cycle of operation repeats. The cycle of operation will repeat indefinitely until such time as the contacts 113 are again closed, applying potential to the control electrode 114 over the charging condenser 117. With control potential applied to the control electrode 114 over the condenser 117 and after the thyratron 115 has ceased firing, a hold-off bias will be developed by the condenser 117 for the control electrode 114 by grid rectification, and the cycle of operations will then cease until the contacts 113 are again open.

There is now presented the problem of preventing closure of the contacts 113 until a complete cycle of operation has been completed by the control pulse generator illustrated in Figure 3, that is, until a sequence of two control pulses have been transferred over the line 80 followed by a further sequence of two control pulses over line 66, as well as by firing of three ignitrons in response to each of the pulses.

In order to assure that a welding cycle will not be terminated before completion of a complete cycle of low frequency welding current, the following is provided. It will be recalled the condenser 120 is charged when the thyratron 115 fires, and retains its charge until completion of a cycle of operations, thereafter discharging, and that it is the discharge of the condenser 120 to a suitable value which enables firing of the thyratron 130 and consequent recharging of the condensers 136 and 139 signaling termination of a cycle of welding current. Accordingly, the condenser 120 may be assumed to be charged for the duration of a cycle of welding current and to be discharged at the termination of the cycle. A lead 160 is provided, accordingly, which communicates conductively with the negative terminal of the condenser 120 over an obvious circuit, and which applies the negative potential of the condenser 120, while the latter is charged, to an auxiliary control grid 161 of a thyratron WT which, when energized, signals the end of a welding period. Since the negative potential provided by the line 160 maintains the auxiliary control electrode 161 of thyratron WT at a negative potential over a full cycle of welding current, the thyratron WT cannot fire until the end of a cycle of welding current, but is free to fire thereafter upon application to the control electrode 162 thereof of suitable firing potential. In the normal operation of the thyratron WT firing potential may be applied to the control electrode 162 at relatively random times, that is, at times which are not positively related to the condition or phase of the welding current. In accordance with my invention then, application of firing potential to the grid 162 is powerless to cause cessation of a welding period if the control electrode 161 is being then supplied with negative bias, signaling that a cycle of welding current had not terminated. After application to the control electrode 162 of firing potential, the thyratron WT is prevented from firing by negative potential on the control electrode 161 until completion of a cycle of welding current, at which time the potential of the control electrode 161 has risen positively sufficiently to enable the thyratron WT to conduct.

It is further essential for the proper functioning of welding equipment embodying my inventions that termination of a welding period likewise terminate operation of the pulsing generator which controls firing of the ignitrons 1TU through 6TU. For this purpose a pair of contacts 163 is introduced intermediate the cathode 126 and the double diode 125 and the anode of the thyratron 115, the normally closed contacts 163 being opened in response to energization of the relay WTD (Fig. 3) which controls weld time and which is energized in response to firing of the weld time thyratron WT. Accordingly, after the thyratron WT has fired, signaling termination of the weld period, and the relay WTD has been energized in response to such firing, the contacts 163 open, opening the anode circuit of the thyratron 115 and disabling completely the control circuit which generates control pulses for initiating operation of the ignitron 1TU through 6TU.

Reference is now made particularly to Figure 3 of the drawings wherein is illustrated schematically the circuits required for controlling the sequencing of a welding system arranged in accordance with the present invention. Power for the sequencing equipment is derived across lines L1 and L2 of the three phase power line to which is connected the primary 105 of a transformer 104, the secondary 103 of which, as has been explained hereinbefore, is utilized for establishing alternating potential on the lines 110, 111, 112. Connected between the line 170, which ties directly to the line 110, and the line 112, which is connected to the center tap of the secondary winding 103 of the transformer 104, is a control relay CR in series with a manually operable switch SW. Closure of the switch SW, accordingly, energizes the control relay CR, which pulls up, closing the normally open contacts 171 and 172 and opening the normally closed contacts 173. Closure of the contacts 171 completes a circuit from the line 110 via the squeeze time delay relay STD and the squeeze time thyratron ST to the line 112. Accordingly, anode potential is applied to the anode of the thyratron ST, and squeeze time delay relay STD is arranged to be energized by firing of the squeeze time thyratron ST. Closure of the normally open contacts 172 establishes potential on a line 174, this potential performing a function which will be explained hereinafter.

Prior to energization of the control relay CR, and consequently prior to opening of the contacts 173, hold-off potential applied to the control electrode of the squeeze time thyratron ST is derived via the following circuit. The pair of resistances 175 and 176 are connected across the lines 177 and 112 in series. The line 177 is connected over a dropping resistance 178 with the line 110, and consequently with one terminal of the secondary winding 103 of the transformer 104. To the terminal 179 joining the resistances 175 and 176, and extending between that terminal and the line 111 over normally closed contacts 173 of relay CR is a further pair of series connected resistances 180 and 181. Since the potentials on the lines 177 and 111 are oppositely phased with respect to the potential of the line 112, the latter being connected to the center tap of the secondary winding 103, and the lines 177 and 111 to opposite ends of the secondary winding 103, the potential applied to the control electrode of the squeeze time thyratron ST and deriving from the terminal 182, forming the junction point between the resistances 180 and 181, is of such phase as to maintain thyratron ST normally non-conductive, and the potential established between the terminal 182 and the line 112 furthermore serves to charge the condenser 183 by grid circuit conduction in the thyratron ST, in such fashion as to establish a steady negative potential for the thyratron ST, serving to maintain the latter in cut-off condition even in the absence of the alternating hold-off bias applied thereto.

Upon opening of the contacts 173, however, in response to energization of the control relay CR, application of alternating voltage to the control electrode of the squeeze time thyratron ST from the terminal 182 ceases. The potential applied to the control electrode of thyratron ST now derives from the terminal point 179, and is in phase with the potential applied to the anode of the thyratron ST. The alternating potential now applied to the control electrode of the thyratron ST is not, however, of sufficient magnitude to enable firing of the thyratron ST, since the alternating voltage, even at its positive peaks, is not as great as the steady bias potential established by the charge on the condenser 183.

The charge on the condenser 183, however, now proceeds to leak off over a leak or discharge path comprising a fixed resistance 184 and a variable resistance 185, the resistance setting of the latter serving to determine the discharge time of the condenser. Accordingly, after a time determined by the setting of the variable resistance 185 the charge on the condenser 183 leaks off to a sufficient extent to enable a succeeding cycle of alternating potential at the contact 171 to cause firing of the thyratron ST, whereupon the latter fires, energizing the squeeze time delay relay STD and signaling end of squeeze time in the welding sequence.

Anode potential for the weld time thyratron WT and for the weld time relay WTD is derived from the line 110 via the contacts 171, now closed, since the relay CR is energized, over the rectifier unit 186, through the winding of the weld time delay relay WTD, and over the normally open contacts 187, and directly to the anode of the weld time thyratron WT. Upon energization of the squeeze time delay relay STD, however, the contacts 187 are closed and anode potential is then applied to the anode of the weld time thyratron WT via the weld time delay relay WTD. The weld time thyratron WT is associated with a control circuit, connected with the control electrode 162 thereof, and comprising a pair of series connected resistors 188 and 189 which are connected between the lines 177 and 112, the terminal point 190 between the two resistors being connected further in series with a pair of resistors 191 and 192, and thence via normally closed contacts 193 with the line 111. Control electrode 162 is connected in series with a charging condenser 194 and with the terminal point between the resistors 191 and 192. Accordingly while the contacts 193 are closed, as they normally are, the potential applied to the control electrode 162 of the weld time thyratron WT is in opposite phase to the voltage applied to the anode of that thyratron, maintaining the thyratron cut off, and further serving to charge the condenser 194, by grid conduction. The condenser 194 is connected in series between the terminal point between resistors 191 and 192 and the control electrode 162, the charge thereon being in such sense as to establish a steady negative bias on the control electrode 162.

Opening of the contacts 193 in response to energization of the squeeze time delay relay STD disconnects the resistance 192 from the line 111, and serves to establish an alternating voltage on the control electrode 162 of the thyratron WTD, which is derived from the junction point 190, and which consequently is in phase with the anode potential applied to the anode of the weld time thyratron WT. Nevertheless, the thyratron WT is not permitted to fire since the alternating potential applied to the control electrode 162 from the terminal between resistors, 191 and 192 is of insufficient magnitude to overcome the steady negative bias provided by the condenser 194. Disconnection of resistor 192 from the line 111, however, has further prevented additional charging of the condenser 194 and the latter now proceeds to discharge over a pair of series connected resistors 195 and 196, the latter resistor being adjustable in magnitude to enable predetermination of weld time by determining the total time required for discharge of the condenser 194 to a value sufficiently low to enable the positive peaks of potential at the junction point 190 to cause firing of the weld time thyratron WT.

Energization of the squeeze time delay relay STD, which signals the end of the squeeze time period, and commencement of the weld time period, further opens the contacts 113 in the line 111 thus removing charging potential from the condenser 117 and initiating generation of weld control pulses by the circuit of Figure 3, in a manner which has been fully explained hereinabove.

After discharge of the condenser 194 to a sufficient extent, the potential on the control electrode 162 of the weld time thyratron WT decreases to an extent sufficient to enable firing of the thyratron in response to the potential of the terminal point 190, provided, however, that the auxiliary control electrode 161 of the thyratron WT is not biased negatively to an extent sufficient to prevent such firing. As has been explained hereinabove, the auxiliary control electrode 161 maintains its negative potential for the duration of a welding cycle and at the termination of the welding cycle goes sufficiently positive to enable the thyratron WT to fire, if the control electrode 162 is at that time provided with a firing potential. We may assume, then, that after a sufficient time has elapsed the electrode 162 has attained a bias such as to enable firing of the thyratron WT, and that the end of a welding cycle of low frequency alternating current has occurred, whereby the auxiliary control electrode 161 rises to firing potential, and that the thyratron WT then fires, terminating the welding period.

Firing of the weld time thyratron WT energizes the weld time delay relay WTD which now pulls up opening the normally closed contacts 163, which, as has been explained hereinabove, are connected in series between the cathode 126 of the double diode 125 and the thyratron 115, completely disabling the circuit, illustrated in Figure 3, which provides the control pulses for the firing tubes and for the ignitrons, and thereby preventing any further transfer of current from the three phase lines L1, L2, L3 to the welding load L, via the welding transformer T.

Additionally, energization of the weld time delay relay WTD effects opening of the normally closed contacts 197 which serves to initiate hold time. Hold time thyratron HT is normally biased off in a manner similar to that described in connection with the operation of the squeeze time relay thyratron ST, and of the weld time relay thyratron WT, the timing condenser 198 being normally charged by grid conduction. Upon opening of the contacts 197 the charging circuit for the condenser 198 is opened and the condenser proceeds to discharge via the resistances 199 and 200, the latter resistance being variable in magnitude to establish variable hold times for the hold time thyratron HT. After the condenser 198 has discharged to a sufficient extent, the thyratron HT, which receives its anode potential from either the line 110 or the line 174, via either the contacts 201a or 201b of the manual two-position switch R, in accordance with whether Repeat or Non-Repeat operation is desired, and thence via line 202 and normally closed contacts 203, fires, signifying end of hold time.

Assuming Non-Repeat operation, contacts 201b are closed and contacts 201a open, and off-time thyratron OT is deprived of voltage, taking no part in the sequencing operation. The firing of the hold time thyratron HT energizes the hold time delay relay HTD, opening the normally closed contacts 204, 205, 206 and 207.

The contacts 206 are in series between the line 111 and the contacts 173, thus preventing re-establishment of hold-off bias for the squeeze time thyratron ST by closure of the contacts 173. The contacts 205 are connected between the line 111 and the now open contacts 197, which, when closed, serve to establish hold-off bias for the hold time thyratron HT. Accordingly, opening of the contacts 205 prevents re-establishment of hold-off bias for the hold time thyratron HT, even should the weld time relay be de-energized, closing contacts 197. Opening of the normally closed contacts 204 dis-establishes the off-bias circuit 208 for the control electrode of the off-time thyratron OT, and which serves normally to establish hold-off bias therefor. Accordingly, opening of the contacts 204 serves to initiate discharge of the timing condenser 209 over the timing resistors 210 and 211, the latter being variable to provide for adjustment of off times, and after a predetermined time the condenser 208 discharges over the resistors 210 and 211 to an extent sufficient to remove hold-off bias for the control electrode of the off-time thyratron OT, which may then be overcome by the positive peaks of alternating current present at the terminal point 212 between the resistors 213 and 214, which are connected across the lines 177 and 112. However, the off-time thyratron OT has an open anode circuit at the switch R, and cannot fire.

Energization of the hold time relay HTD additionally opens the contacts 207, which are normally closed, and which normally maintain a circuit for energizing the control relay CR. Accordingly, when hold time terminates, as signified by energization of the hold time relay HTD, the control relay CR is de-energized, reopening the normally open contacts 171 and thereby de-energizing the squeeze time delay relay STD. The normally open contacts 172 are likewise now opened, in response to de-energization of control relay CR, breaking the holding circuit for the control relay CR at a further point, so that the relay CR will remain de-energized regardless of the condition of the contacts 207 at succeeding times. Opening of contacts 172 breaks, as well, the line 174, removing anode potential from thyratron HT. The contacts 173 are closed by de-energization of control relay CR which permits re-establishment of hold-off bias for the squeeze time thyratron ST. De-energization of the squeeze time delay relay STD likewise closes the normally closed contacts 193, to enable re-establishment of a hold-off bias on the control electrode 162 of the weld time thyratron WT.

De-energization of the squeeze time delay relay STD, further opens the normally open contacts 187, removing anode potential from the weld time thyratron WT, and thereby current from the weld time delay relay WTD, enabling closure of the normally closed contacts 197 and 163.

De-energization of the squeeze time delay relay STD, additionally, enables closure of contacts 113 and de-energization of weld time delay relay WTD accomplishes closure of contacts 163, the frequency control circuit of Figure 3 being thereby established in operative condition, ready for a succeeding welding operation in response to further closure of the manual switch SW, and the sequence system being likewise in its original condition, ready for a further welding operation.

Should it be desired to provide repeat operation instead of the non-repeat operation which has just been described, the double throw repeat switch R is thrown into its alternative position, closing contacts 201a and opening contacts 201b, providing the off-time relay OT and the off-time delay relay OTD with potential via the line 110 and the switch R. The hold time thyratron HT and the hold time delay relay HTD are not now in circuit with line 174, but rather with line 110, via contacts 201a, and 203. Accordingly, de-energization of control relay CR has no effect on the hold time thyratron HT, and the latter remains energized until the off-time thyratron has fired, opening contacts 203, disabling hold time thyratron HT and hold time delay relay HTD. Release of the latter provides a grid conduction charging circuit for thyratron OT, which is thus biased off. Release of hold time delay relay HTD recloses contacts 207 enabling re-energization of control relay CR and initiation of a further weld sequence.

The two position switch R performs the function of by-passing the circuit closer SW, and providing a circuit over line 110 for the control thyratrons HT and OT, when in the repeat position, and supplying operating voltage to the hold circuit comprising the thyratron HT and the relay HTD to the exclusion of the off relay OT and the off relay OTD when in the alternative position. When the switch R assumes the repeat position, the system operates in repeated cycles, whereas in the alternative or non-repeat position the system contemplates making of single welds. The latter operation requires no off-time, and each welding operation requires a separate closure of the switch SW. The repeat operation on the other hand requires the inter-position of an "off" period between the hold and the squeeze period.

It is to be understood that the present invention is not limited to the particular details described above, since many equivalents for the specific elements and arrangements utilized in the above disclosure will suggest themselves to those skilled in the art. While the invention has been disclosed as applied to a welding system, it is susceptible broadly to use as a system of controlled transmission of power between a three phase power source and a single phase load. Additionally, the system may be considered broadly as a frequency changing system for translating the frequency of a source into a lower frequency, having a value which may be selected at will. Various types of tubes may be substituted for the electronic discharge devices disclosed, and modification of the specific circuit arrangement disclosed may be devised, which, however, incorporate the principles of operation set forth in the specific embodiment of the invention herein disclosed.

In view of the above facts, it is desired that the appended claims be accorded a broad interpretation which is commensurate with the true spirit and scope of the invention within the pertinent art.

I claim as my invention:

1. In a timing system for controlling transmission times of current in alternately opposite directions between the phases of a three phase line and a single phase load, a plurality of gaseous conduction devices for controlling transfer of current from said phases of said three phase line to said single phase load in sequence, a relay for terminating conduction times of said gaseous conduction device when said relay is energized, means comprising a gaseous control valve for energizing said relay when said gaseous control valve is fired, and means operative during firing of any one of said gaseous conduction devices for preventing firing of said gaseous control valve.

2. In a timing system for controlling transmission time of current in alternately opposite directions for equal times between the phases of a three phase line and a single phase load, a plurality of gaseous conduction devices for controlling transfer of current from said three phases of said three phase line to said single phase load in sequence in a first direction and thereafter in sequence from said three phases of said three phase line to said load in a second direction, a relay, means for terminating said transmission time in response to energization of said relay, means for initiating and measuring said transmission time comprising a discharge valve connected in series with said relay, and having first and second control electrodes, and a timing circuit for determining off time of said discharge valve comprising means for applying cut-off bias to one of said control electrodes for a predetermined time, and means operative during firing of any of said plurality of gaseous conduction devices for maintaining cut-off bias on the other of said control electrodes.

3. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, each of which is connected in current controlling relation between one phase of the power source and the load so as to supply said load with current of one polarity, and a timing device adapted to be supplied from a single phase of said three-phase source and to deliver control impulses of one polarity, one each, during a predetermined number of periods of said source, a grid controlled electronic control tube being associated with each of said arc discharge devices the anode circuits of said control tubes each being connected to the same phase of said source as the corresponding arc discharge device, each of said control tubes including, in its grid circuit, biasing means, tending to maintain said control tubes non-conductive, and energy storage means, the energy storage means of the first control tube, associated with the first discharge device, being connected to said timing device to be charged thereby to condition said first control tube to become conductive when the potentials between its electrodes attain the proper magnitudes, said first control tube being operatively connected to said first discharge device and to the energy storage means of the second control tube, associated with the seocnd discharge device, so that said first control tube, when rendering the first discharge device conductive, simultaneously charges the energy storage means of said second control tube to condition said second control tube to become conductive when the potentials between its electrodes attain the proper magnitudes to render the latter conductive subsequently, said second control tube being similarly operatively connected to the second discharge device and to the energy storage means of the third control tube, associated with the third dischagre device, said third control tube being operatively connected only to said third discharge device.

4. In a timing system for controlling sequential transmission times of current between a first three phase line and a load, the combination comprising first, second and third gaseous conduction devices for transmitting current from first, second and third phases, respectively, of said three phase line to said load in a first predetermined direction, fourth, fifth and sixth gaseous conduction devices for transmitting current from said first, second and third phases, respectively of said three phase line to said load in a second predetermined direction, a second three phase line, phase shift means connected between said first line and said second line to shift the potential of each phase of said second line by a predetermined angle with respect to a corresponding phase of said first line, first, second and third firing control valves for said first, second and third gaseous conduction devices, respectively, fourth, fifth and sixth firing control valves for said fourth and fifth and sixth gaseous conduction devices, respectively, means connecting said first and fourth firing control valves to a first phase of said second line to be energized in opposite phase from said first phase of said second line, means connecting said second and fifth firing control valves to a second phase of said second line to be energized in opposite phase by said second phase of said second line, means connecting said third and sixth firing control valves to a third phase of said second line to be energized in opposite phase by said third phase of said second line, first means for generating a control pulse for actuating said first firing control valve for firing said first gaseous conduction device at an instant in said first phase of said first line corresponding to said predetermined angle for said first phase of said second line, means responsive to actuation of said first firing control valve for generating a second control pulse for actuating said second firing control valve for firing said second gaseous conduction device at an instant in a period of said second phase of said first line corresponding to said predetermined angle for said second phase of said second line, means responsive to actuation of said second firing control valve for generating a third control puse for actuating said third firing control valve for firing said third gaseous conduction device at an instant in a period of said third phase of said first line corresponding to said predetermined angle for said third phase of said second line, second means for generating a control pulse for actuating said fourth firing control valve for firing said fourth gaseous conduction device at an instant in a period of said first phase of said first line corresponding to said predetermined angle for said first phase of said second line, means responsive to actuation of said fourth firing control valve for generating a fifth control pulse for actuating said fifth firing control valve for firing said fifth gaseous conduction device at an instant in a period of said second phase of said first line corresponding to said predetermined angle for said second phase of said second line, and means responsive to actuation of said fifth firing control valve for generating a sixth control pulse for actuating said sixth firing control valve for firing said sixth gaseous conduction device at an instant in a period of said third phase of said first line corresponding to said predetermined angle for said third phase of said second line.

5. In a system for timing transfer of current between a three phase line and a single phase load in alternately opposite directions for equal time periods, comprising in combination first normally inoperative means for transferring a current pulse once from each of the several phases of said three phase line to said single phase load in timed succession, in a predetermined order only, and in a first direction, second normally inoperative means for transferring a current pulse once from each of the several phases of said three phase line to said single phase source in timed succession, in a predetermined order only, and in a second direction, first control means responsive to a first single control pulse for rendering said first means operative and responsive to succeeding first control pulses for further rendering said first means operative, further control means responsive to a second single control pulse for rendering said second means operative, and responsive to succeeding second single control pulses for further rendering said second means operative, first means for generating a predetermined number of said first control pulses, said first means including a first electric discharge device having an anode, a cathode and a control electrode, a first circuit including said anode and cathode for transmitting said first control pulses, and a first time constant network connected to said control electrode when charged for blocking the flow of said control pulses through said circuit, second means for generating a like predetermined number of said second control pulses, said second means including a second electric discharge device having an anode, a cathode and a control electrode, a second circuit including said last-named anode and cathode for transmitting said second control pulses and a second time constant network when charged blocking the flow of said second control pulses through said second circuit, means including a third electric discharge device to be rendered conducting for charging said first network, means including a fourth electric discharge device to be rendered conducting for charging said second network, means for rendering said third device non-conducting during a first predetermined time interval to permit said first network to discharge and remain discharged during at least a portion of said first interval and means for rendering said fourth device non-conducting during a second time interval to permit said second network to discharge and remain discharged during at least a portion of said second interval.

6. In combination a plurality of pairs of supply conductors adapted to be energized from a polyphase supply and when so energized adapted to supply potentials displaced in phase in accordance with the phases of the supply, a first electric discharge device having an anode, a cathode and a control electrode, a first time constant network, a first transformer having a secondary, a first rectifier, means connecting in series said secondary, said rectifier and said network, means connecting said network between said control electrode and said cathode, a second electric discharge device having an anode, a cathode and a control electrode, a second time constant network, a second rectifier, a second transformer having a primary and a secondary, means including said primary connecting said anode and cathode of said first device to be supplied from a first of said pairs of conductors, means connecting in series said secondary of said second transformers, said second rectifier and said second network, means connecting said second network between the control electrode and cathode of said second device, a third electric discharge device having an anode, a cathode and a control electrode, a third time constant network, a third rectifier, a third transformer having a primary and a secondary, means including said pimary of said third transformer connecting said anode and cathode of said second device to be supplied from a second of said pairs of conductors, means connecting in series the secondary of said third transformer, said third rectifier and said third network, means connecting said third network between the control electrode and cathode of said third device, and means connecting said anode and cathode of said third device to be supplied from a third pair of said conductors.

7. In a timing system for controlling sequential transmission times of current between a three phase line and a single phase load, a plurality of ignitrons for effecting transfer of current in a predetermined sequence between the three phases of said three phase line and said single phase load in a first direction, a further plurality of ignitrons for effecting transfer of current in a predetermined sequence between the three phases of said three phase line and said single phase load in a second direction, a relay, means for energizing said relay, means responsive to energization of said relay for initiating said transfer of current in a predetermined sequence and in a first direction between the phases of said three phase line and said single phase load, a further relay, means for energizing said further relay, means responsive to energization of said further relay for terminating said transfer in said first direction, control means for disabling said means for energizing said further relay, and means for rendering said control means operative only after termination of transfer of current in a predetermined sequence between all three phases of said three phase line and said single phase load in said second direction.

8. In combination, first, second and third conductors of a polyphase supply, first, second and third transformers, each transformer having a primary and a secondary having an intermediate tap, means connecting said primary of said first transformer between said first conductor and said second conductor, means connecting said primary of said second transformer between said second conductor and said third conductor, means connecting the primary of said third transformer between said third conductor and said first conductor, first resistance means, second resistance means, third resistance means, means connecting each said resistance means between a common electrical point and the intermediate tap of a different one of said secondaries, fourth resistance means, fifth resistance means, sixth resistance means, said fourth, fifth and sixth resistance means being variable, and means connecting said fourth, fifth and sixth resistance means in a delta network with said intermediate taps as apices.

9. In combination, first, second and third conductors of a polyphase supply, first, second and third transformers, each transformer having a primary and a secondary having an intermediate tap, means connecting said primary of said first transformer between said first conductor and said second conductor, means connecting said primary of said second transformer between said second conductor and said third conductor, means connecting the primary of said third transformer between said third conductor and said first conductor, first resistance means, second resistance means, third resistance means, means connecting each said resistance means between a common electrical point and the intermediate tap of a different one of said secondaries, fourth resistance means, fifth resistance means, sixth resistance means, said fourth, fifth and sixth resistance means being variable, means connecting said fourth, fifth and sixth resistance means in a delta network with said intermediate taps as apices, first, second and third electric discharge devices each having a pair of principal electrodes, means connecting a principal electrode of said first device to said fourth resistance means, means connecting a principal electrode of said second device to said fifth resistance means, means connecting a principal electrode of said third device to said sixth resistance means, and means connecting the other principal electrodes of said devices to said common point.

10. In an electrical controlling apparatus for supplying an electrical load from an alternating electrical source, a pair of normally de-energized voltage producing devices, selectively energized means for alternately energizing said devices at the desired load frequency, means for energizing said selective means to initiate a pulsating operation of said devices and including means responsive to the frequency of said source for synchronizing the instant of initiation of said pulsations with respect to the voltage wave of said source, a pair of asymmetric current conducting devices connected in reverse relation between said source and said load, and means responsive to said pulsations of one of said voltage producing devices for rendering one of said asymmetric devices conductive and responsive to said pulsations of the other of said voltage producing devices for rendering the other of said asymmetric devices conductive.

11. In a network for supplying single phase alternating voltage to a load circuit from a polyphase source of voltage supply, frequency control means for supplying pulses of voltage at twice the desired frequency of said load circuit, a first set of asymmetric current conducting means individually connecting each of said source phases to said load circuit, a second set of asymmetric current conducting means individually connecting each of said source phases to said load circuit, said first set of asymmetric means being connected to supply current to said load circuit in a direction opposite to that of said second set of asymmetric means, means responsive to alternate pulses of said frequency control means for rendering said first set conductive, means responsive to opposite alternate pulses of said frequency control means for rendering said second set conductive, said frequency control means including means for establishing a predetermined time period between the actuation of said frequency control means and said sets.

12. In a network for supplying single phase alternating voltage to a load circuit from a polyphase source of voltage supply, a first set of asymmetric current conducting devices individually connecting the phases of said source to said load to pass current in one direction, a second set of current conducting devices individually connecting the phases of said source to said load to pass current in a direction opposite to said one direction, a control circuit individual to each of the phases of said source, each said circuit comprising a first control device operable to render the respective said asymmetric devices of said first set conductive and a second control device operable to render the respective said asymmetric devices of said second set conductive, means connecting said first devices for sequential operation and including a signal circuit interconnecting each said preceding one of said first devices with the next succeeding one of said first devices whereby the rendering of a predetermined first-to-be-actuated one of said first devices effective results in the remainder of said first devices being sequentially rendered effective irrespective of the condition of said asymmetric devices, means connecting said second devices for sequential operation and including a signal circuit interconnecting each said preceding one of said second devices with the next succeeding one of said second devices whereby the rendering of a predetermined first-to-be-actuated one of said second devices effective results in the remainder of said second devices being sequentially rendered effective irrespective of the condition of said asymmetric devices, means operable at the desired frequency of said load circuit and in predetermined relation to the phase of the voltage of one of the phases of said source to render said predetermined first-to-be-actuated one of said first control devices effective and to render said one predetermined first-to-be-actuated one of said second control devices effective.

13. In a network for supplying single phase alternating voltage to a load circuit from a polyphase source of voltage supply, a first set of asymmetric current conducting devices individually connecting the phases of said source to said load to pass current in one direction, a second set of current conducting devices individually connecting the phases of said source to said load to pass current in a direction opposite to said one direction, a control circuit individual to each of the phases of said source, each said circuit comprising a first control device operable to render the respective said asymmetric devices of said first set conductive and a second control device operable to render the respective said asymmetric devices of said second set conductive, means connecting said first devices for sequential operation and including a signal circuit interconnecting each said preceding one of said first devices with the next succeeding one of said first devices whereby the rendering of a predetermined first-to-be-actuated one of said first devices effective results in the remainder of said first devices being sequentially rendered effective irrespective of the condition of said asymmetric devices, means connecting said second devices for sequential operation and including a signal circuit interconnecting each said preceding one of said second devices with the next succeeding one of said second devices whereby the rendering of a predetermined first-to-be-actuated one of said second devices effective results in the remainder of said second devices being sequentially rendered effective irrespective of the condition of said asymmetric devices, means operable at the desired frequency of said load circuit and in predetermined relation to the phase of the voltage of one of the phases of said source to render said predetermined first-to-be-actuated one of said one first control devices effective and to render said predetermined first-to-be-actuated one of said second control devices effective, and means for determining the points in the wave of said source voltage supply that each of said first and second devices are effective to actuate said asymmetric devices.

14. In a network for supplying single phase alternating voltage to a load circuit from a polyphase source of voltage supply, a first set of asymmetric current conducting devices individually connecting the phases of said source to said load to pass current in one direction, a second set of asymmetric current conducting devices individually connecting the phases of said source to said load to pass current in a direction opposite to said one direction, a control circuit individual to each of the phases of said source, each said circuit comprising a first control device operable to render the respective said asymmetric devices of said first set conductive and a second control device operable to render the respective said asymmetric devices of said second set conductive, means connecting said first devices for sequential operation whereby the rendering of one of said first devices effective results in the remainder of said first devices being sequentially rendered effective, means connecting said second devices for sequential operation whereby the rendering of one of said second devices effective results in the remainder of said second devices being sequentially rendered effective, means operable at the desired frequency of said load circuit and in predetermined relation to the phase of the voltage of one of the phases of said source to render said one first control devices effective and to render said one second control devices effective, a polyphase phase shifting network connected to said voltage supply and having a polyphase voltage output, circuit means individually connecting said control circuits to the output phases of said phase shifting network in the same phase order as the phases of said voltage supply are connected to the associated ones of said asymmetric devices.

15. In a network for supplying electrical energy to a load, comprising in combination, a pair of alternately energizable elements, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting said load to a source of electrical energy, said load current network including a first and a second asymmetric current conducting means, said first asymmetric means being connected to conduct current to such load in a first direction, said second asymmetric means being connected to conduct current to such load in a second direction, each of said asymmetric means including a control device for controlling its current conducting condition, a third circuit connecting said control device of said first asymmetric means to said one timing device of said interpulse timing network whereby the conductive condition of said first asymmetric means is controlled, a fourth circuit connecting said control device of said second asymmetric means to said other timing device of said interpulse timing network whereby the conductive condition of said second asymmetric means is controlled, each said timing device of said interpulse timing network having two timing intervals.

16. In a network for supplying electrical energy to a load from a polyphase supply of alternating potential, comprising in combination, a pair of alternately energizable elements, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting such load to a source of electric energy, said load current network including a pair of asymmetric current controlling units connected between each of the phases of such alternating potential supply and said load, a first asymmetric unit of each of said pair of units being polarized to conduct current to such load in a first direction, a second asymmetric unit of each of said pair of units being polarized to conduct current to such load in a second direction, said load current controlling network further including a first and a second biasing means for controlling the conductive condition of each of said asymmetric units, a third circuit connecting said first biasing means to said one timing device of said interpulse timing network whereby the conductive condition of said first asymmetric unit is controlled in timed relationship to the energization of one of said alternately energized elements, a fourth circuit connecting said second biasing means to said other timing device whereby the conductive condition of said second asymmetric unit is controlled in timed relationship to the energization of the other of said alternately energized elements.

17. In an apparatus controlling the flow of electrical energy, a sequencing network including a first and a second energizable device, an electrical energy flow controlling network including at least one pair of normally non conductive asymmetric current controlling devices connected in back-to-back relation between a source of electrical energy and a load, said second energizable device including an electric valve having a pair of main electrodes and a pair of controlling electrodes, a timing means having an output potential circuit connected between one of said controlling electrodes and one of said main electrodes and normally maintaining a bias potential therebetween for holding said valve non conductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control the conductive periods of said asymmetric devices in a conducting condition, and a bias potential circuit connected between the other said controlling electrodes and said one main electrode for applying a blocking bias potential to said valve during periods of conduction of one of said asymmetric controlling devices.

18. In an apparatus controlling the flow of electrical energy, a sequencing network including a first and a second energizable device, an electrical energy flow controlling network controlling flow of energy in each of two directions between a source of electrical energy and a load, said second device including an electric valve having a pair of main electrodes and a pair of controlling electrodes, a timing means having an output potential circuit connected between one of said controlling electrodes and one of said main electrodes and normally maintaining a bias potential therebetween for holding said valve non conductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control said energy flow controlling network and operable to alternately actuate the same to provide for an alternating flow of current between said source and said load, and a bias potential circuit connected between the other said controlling electrodes and said one main electrode for applying a blocking bias potential to said valve during flows of current between said load and said source in one direction.

19. In an apparatus controlling the flow of electrical energy, a sequencing network including a first and a second energizable device, an electrical energy flow controlling network controlling flow of energy in each of two directions between a source of electrical energy and a load, said second device including an electric valve having a pair of main electrodes and a conductivity controlling means, a timing means having an output potential circuit connected between said valve conductivity controlling means and one of said main electrodes and normally maintaining a bias potential therebetween for holding said valve non conductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control said energy flow controlling network and operable to alternately actuate the same to provide for an alternating flow of current between said source and said load, and a bias potential circuit connected between said valve conductivity controlling means and said one main electrode for applying a blocking bias potential to said valve during flows of current between said load and said source in one direction.

20. In a timing system for controlling sequential transmission times of current between a first three phase line and a single phase load, comprising in combination a second three phase line, phase shift means connecting said first three phase line to said second three phase line to shift the potential of each phase of said second line by a predetermined angle with respect to the corresponding phase of said first line, means connected to a first phase of said second line to be actuated and when so actuated for initiating transmission of current between a corresponding first phase of said first line and said load, said initiation taking place at an instant in a period of said first phase corresponding to said predetermined angle for said first phase, means connected to a second phase of said second line actuable responsive to said initiation of transmission for sequentially initiating transmission of current between a corresponding second phase of said first line and said load, said initiation taking place at an instant in a period of said second phase corresponding to said predetermined angle for said second phase, means connected to a third phase of said second line actuable responsive to initiation of transmission of current between said second phase of said first line and said load for sequentially initiating transmission of current between a corresponding third phase of said first line and said load, said initiation taking place at an instant in a period of said third phase corresponding to said predetermined angle for said third phase, and timing means connected to said means connected to said first phase of said second line for actuating said last named means connected as aforesaid during predetermined time intervals, said timing means initiating the transmission of current only between said first phase of said first line and said load at the beginning of each of said intervals.

21. In a timing apparatus, a first timing circuit including a first electric valve normally held in a non-conducting condition and a first dischargeable energy storage network, a second timing circuit including a second electric valve normally held in a nonconducting condition and a biasing network for controlling its conductive condition, said biasing network including a second dischargeable energy storage network, means for rendering said first electric valve conducting, means responsive to the conduction of said first valve for initiating the timing out of both said storage networks, means interconnecting said second storage network with said second electric valve whereby upon the timing out of said second network said second electric valve will become conductive, and means responsive to the timing out of said first storage network for actuating said biasing network to render said second valve nonconductive.

22. In a timing apparatus, a first electric valve having a pair of main electrodes and control means, a bias network connected between said control means and one of said main electrodes, said network comprising a dischargeable energy storage circuit connected between said control means and said one main electrode such that when said circuit is energized said valve is held nonconductive, means normally maintaining said circuit energized, a second electric valve having a pair of main electrodes and a control electrode, a second dischargeable energy storage circuit connected between said control electrode and one of said main electrodes of said second valve, means normally maintaining said second circuit energized, means for substantially concurrently terminating the flow of energy to said circuits, and means including at least a portion of said bias network and responsive to the discharge of said second circuit to a predetermined value to render said first valve nonconducting.

23. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, herein designated as first, second and third devices, each of which is connected in current controlling relationship between one phase of the power source and the load so as to supply said load with current of one polarity and a second group of three discharge devices, herein designated as fourth, fifth and sixth devices, each device of the second group being connected in anti-parallel with a corresponding device of the first group, and a timing device adapted to be supplied from a single-phase of said three-phase source and to deliver control impulses of one polarity, one each for each group of discharge devices, during a pretermined number of periods of said source, a grid controlled electronic control tube being associated with each of said arc discharge devices, the anode circuits of said control tubes each being connected to the same phase of said source as the corresponding arc discharge device, each of said control tubes including, in its grid circuit, biasing means, tending to maintain said control tube non-conductive, and energy storage means, the energy storage means of the first control tube and the fourth control tube, associated with the first discharge device and the fourth discharge device respectively, being connected to said timing device to be charged thereby to condition said first control tube and fourth control tube to become conductive when the potentials between its electrodes attain the proper magnitudes, said first control tube and fourth control tube being operatively connected to said first discharge device and fourth discharge device and to the energy storage means of the second control tube and the fifth control tube, associated with the second discharge device and the fifth discharge device respectively, so that said first control tube and said fourth control tube, when rendering the first discharge device and the fourth discharge device respectively conductive, simultaneously charge the energy storage means of said second control tube and said fifth control tube to condition said second control tube and said fifth control tube to become conductive when the potentials between their respective electrodes attain the proper magnitudes to render the latter conductive subsequently, said second control tube and said fifth control tube being similarly operatively connected to the second discharge device and the fifth discharge device respectively and to the energy storage means of the third control tube and the sixth control tubes respectively, associated with the third discharge device and the sixth discharge device respectively, said third control tube and said sixth control tube being operatively connected only to said third discharge device and said sixth discharge device respectively.

24. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, herein designated as first, second and third devices, each of which is connected in current controlling relationship between one phase of the power source and the load so as to supply said load with current of one polarity and a second group of three discharge devices, herein designated as fourth, fifth and sixth devices, each device of the second group being connected in anti-parallel with a corresponding device of the first group, and a timing device adapted to be supplied from a single-phase of said three-phase source and to deliver control impulses of one polarity, one each for each group of discharge devices, during a predetermined number of periods of said source, a grid controlled electronic control tube being associated with each of said arc discharge devices, the anode circuits of said control tubes each being connected to the same phase of said source as the corresponding arc discharge device, each of said control tubes including, in its grid circuit, biasing means, tending to maintain said control tube non-conductive, and energy storage means, the energy storage means of the first control tube and the fourth control tube, associated with the first discharge device and the fourth discharge device respectively, being connected to said timing device to be charged thereby to condition said first control tube and fourth control tube to become conductive when the potentials between its electrodes attain the proper magnitudes, said first control tube and fourth control tube being operatively connected to said first discharge device and fourth discharge device respectively and to the energy storage means of the second control tube and the fifth control tube respectively associated with the second discharge device and the fifth discharge device respectively, so that said first control tube and said fourth control tube, when rendering the first discharge device and the fourth discharge device respectively conductive, simultaneously charges the energy storage means of said second control tube and said fifth control tube respectively to condition said second control tube and said fifth control tube to become conductive when the potentials between its electrodes attain the proper magnitudes to render the latter conductive subsequently, said second control tube and said fifth control tube being similarly operatively connected to the second discharge device and the fifth discharge device respectively and to the energy storage means of the third control tube and the sixth control tube respectively, associated with the third discharge device and the sixth discharge device respectively, said third control tube and said sixth control tube being operatively connected only to said third discharge device and said sixth discharge device respectively, said timing device being adjustable to supply a predetermined number of control impulses in succession to said one group of discharge devices, to supply subsequently the same number of control impulses in succession to said second group of discharge devices, and to repeat this whole cycle of control impulses a predetermined number of times.

25. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, herein designated as first, second and third devices, each of which is connected in current controlling relationship between one phase of the power source and the load so as to supply said load with current of one polarity and a second group of three discharge devices, herein designated as fourth, fifth and sixth devices, each device of the second group being connected in anti-parallel with a corresponding device of the first group, and a timing device adapted to be supplied from a single-phase of said three-phase source and to deliver control impulses of one polarity, one each for each group of discharge devices, during a predetermined number of periods of said source, a grid controlled electronic control tube being associated with each of said arc discharge devices, the anode circuits of said control tubes each being connected to the same phase of said source as the corresponding arc discharge device, each of said control tubes including, in its grid circuit, biasing means, tending to maintain said control tube non-conductive, and energy storage means, the energy storage means of the first control tube and the fourth control tube, associated with the first discharge device and the fourth discharge device respectively, being connected to said timing device to be charged thereby to condition said first control tube and fourth control tube to become conductive when the potentials between its electrodes attain the proper magnitudes, said first control tube and fourth control tube being operatively connected to said first discharge device and fourth discharge device respectively and to the energy storage means of the second control tube and the fifth control tube respectively, associated with the second discharge device and the fifth discharge device respectively, so that said first control tube and said fourth control tube, when rendering the first discharge device and the fourth discharge device conductive, simultaneously charges the energy storage means of said second control tube and said fifth control tube respectively to condition said second control tube and said fifth control tube respectively to become conductive when the potentials between its electrodes attain the proper magnitudes to render the latter conductive subsequently, said second control tube and said fifth control tube being similarly operatively connected to the second discharge device and the fifth discharge device respectively and to the energy storage means of the third control tube and the sixth control tube respectively, associated with the third discharge device and the sixth discharge device respectively, said third control tube and said sixth control tube being operatively connected only to said third discharge device and said sixth discharge device respectively, said timing device being adjustable to supply a predetermined number of control impulses in succession to one group of discharge devices, to supply subsequently the same number of control impulses in succession to the second group of discharge devices, and to repeat this whole cycle of control impulses a predetermined number of times, said system also including a "weld-time" relay adapted to terminate the flow of current to said load by rendering said timing device inoperative, a control circuit adapted to condition said relay to operate, and interlock means between said timing device and said control circuit adapted to permit said relay to cause the timing device to become inoperative only after said timing device has completed the delivery of all control impulses of the full cycle of such impulses during any part of which said relay is conditioned to operate.

26. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, herein designated as first, second and third devices, each of which is connected in current controlling relationship between one phase of the power source and the load so as to supply said load with current of one polarity and a second group of three discharge devices, herein designated as fourth, fifth and sixth devices, each device of the second group being connected in anti-parallel with a corresponding device of the first group, and a timing device adapted to be supplied from a single-phase of said three-phase source and to deliver control impulses of one polarity, one each for each group of discharge devices, during a predetermined number of periods of said source, a grid controlled electronic control tube being associated with each of said arc discharge devices, the anode circuits of said control tubes each being connected to the same phase of said source as the corresponding arc discharge device, each of said control tubes including, in its grid circuit, biasing means, tending to maintain said control tube non-conductive, and energy storage means, the energy storage means of the first control tube and the fourth control tube, associated with the first discharge device and the fourth discharge device respectively, being connected to said timing device to be charged thereby to condition said first control tube and fourth control tube to become conductive when the potentials between its electrodes attain the proper magnitudes, said first control tube and fourth control tube being operatively connected to said first discharge device and fourth discharge device respectively and to the energy storage means of the second control tube and fifth control tube respectively, associated with the second discharge device and the fifth discharge device respectively, so that said first control tube and said fourth control tube, when rendering the first discharge device and the fourth discharge device respectively conductive, simultaneously charges the energy storage means of said second control tube and said fifth control tube respectively to condition said second control tube and said fifth control tube to become conductive when the potentials between its electrodes attain the proper magnitudes to render the latter conductive subsequently, said second control tube and said fifth control tube being similarly operatively connected to the second discharge device and the fifth discharge device respectively and to the energy storage means of the third control tube and the sixth control tube respectively, associated with the third discharge device and the sixth discharge device respectively, said third control tube and said sixth control tube being operatively connected only to said third discharge device and said sixth discharge device respectively, said timing device being adjustable to supply a predetermined number of control impulses in succession to one group of discharge devices, to supply subsequently the same number of control impulses in succession to the second group of discharge devices, and to repeat this whole cycle of control impulses a predetermined number of times, said system also including a "weld-time" relay adapted to terminate the flow of current to said load by rendering said timing device inoperative, a control circuit adapted to condition said relay to operate, said control circuit including an additional control tube for controlling said relay, and interlock means between said timing device and said control circuit adapted to permit said relay to cause the timing device to become inoperative only after said timing device has completed the delivery of all control impulses of the full cycle of such impulses during any part of which said relay is conditioned to operate, said timing device including an electronic valve and a circuit controlled by said valve and controlling said additional control tube, said interlock means comprising an off-biasing connection for said additional tube provided by said circuit during the time when said valve is conducting so as to prevent said relay from being actuated during said last-named time.

27. A control system for supplying a single-phase load from a three-phase power source with single-phase alternating current of a lower frequency than the frequency of the power source, for a predetermined short time interval of the order of a few cycles of the lower frequency, whereby each half cycle of the lower frequency consists of a predetermined number of cycles of the supply frequency, especially for resistance welding purposes, comprising at least one group of three arc discharge devices, herein designated as first, second and third devices, each of which is connected in current controlling relationship between one phase of the power source and the load so as to supply said load with current of one polarity and a second group of three discharge devices, herein designated as fourth, fifth and sixth devices, each device of the second group being connected in anti-parallel with a corresponding device of the first group, and a timing device adapted to be supplied from a single-phase of said three-phase source and to deliver control impulses of one polarity, one each for each group of discharge devices, during a predetermined number of periods of said source, a grid controlled electronic control tube being associated with each of said arc discharge devices, the anode circuits of said control tube each being connected to the same phase of said source as the corresponding arc discharge device, each of said control tubes including, in its grid circuit, biasing means, tending to maintain said control tube non-conductive, and energy storage means, the energy storage means of the first control tube and the fourth control tube, associated with the first discharge device and the fourth discharge device respectively, being connected to said timing device to be charged thereby to condition said first control tube and fourth control tube respectively to become conductive when the potentials between its electrodes attain the proper magnitudes, said first control tube and fourth control tube being operatively connected to said first discharge device and fourth discharge device respectively and to the energy storage means of the second control tube and the fifth control tube respectively, associated with the second discharge device and the fifth discharge device respectively, so that said first control tube and said fourth control tube, when rendering the first discharge device and the fourth discharge device conductive, simultaneously charges the energy storage means of said second control tube and said fifth control tube respectively to condition said second control tube and said fifth control tube to become conductive when the potentials between its electrodes attain the proper magnitudes to render the latter conductive subsequently, said second control tube and said fifth control tube being similarly operatively connected to the second discharge device and the fifth discharge device respectively and to the energy storage means of the third control tube and the sixth control tube respectively, associated with the third discharge device and the sixth discharge device respectively, said third control tube and said sixth control tube being operatively connected only to said third discharge device and said sixth discharge device respectively, said timing device being adjustable to supply a predetermined number of control impulses in succession to one group of discharge devices, to supply subsequently the same number of control impulses in succession to the second group of discharge devices, and to repeat this whole cycle of control impulses a predetermined number of times, said system also including a "weld-time" relay adapted to terminate the flow of current to said load by rendering said timing device inoperative, a control circuit adapted to condition said relay to operate, said control circuit including an additional control tube for controlling said relay, and interlock means between said timing device and said control circuit adapted to permit said relay to cause the timing device to become inoperative only after said timing device has completed the delivery of all control impulses of the full cycle of such impulses during any part of which said relay is conditioned to operate, said timing device including an electronic valve and a circuit controlled by said valve and controlling said additional control tube, said interlock means comprising an off-biasing connection for said additional tube provided by said circuit during the time when said valve is conducting so as to prevent said relay from being actuated during said last-named time, said system further including means for interposing between the periods of flow of the control impulses for differently polarized load current a predetermined intermission period that is equal to at least one integral period of the three-phase power source.

28. In a network for supplying electrical energy from an alternating potential source to a load, comprising in combination, a pair of alternately energizable elements synchronized with said source, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting said load to a source of electrical energy, said load current network including a first and a second asymmetric current conducting means, said first asymmetric means being connected to conduct current to said load in a first direction, said second asymmetric means being connected to conduct current to said load in a second direction, each of said asymmetric means including a control device for controlling its current conducting condition, a third circuit connecting said control device of said first asymmetric means to said one timing device of said interpulse timing network whereby the conductive condition of said first asymmetric means is controlled, a fourth circuit connecting said control device of said second asymmetric means to said other timing device of said interpulse timing network whereby the conductive condition of said second asymmetric means is controlled, each said timing device of said interpulse timing network having two timing intervals, said timing intervals of said timing devices in said interpulse timing network being such that its time-rate interval for rendering its respectively associated said asymmetric device nonconducting is less than its time-rate for rendering its respectively associated said asymmetric device conducting.

29. In a network for supplying electrical energy from an alternating potential source to a load, comprising in combination, a pair of alternately energizable elements synchronized with said source, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting said load to a source of electrical energy, said load current network including a first and a second asymmetric current conducting means, said first asymmetric means being connected to conduct current to said load in a first direction, said second asymmetric means being connected to conduct current to said load in a second direction, each of said asymmetric means including a control device for controlling its current conducting condition, a third circuit connecting said control device of said first asymmetric means to said one timing device of said interpulse timing network whereby the conductive condition of said first asymmetric means is controlled, a fourth circuit connecting said control device of said second asymmetric means to said other timing device of said interpulse timing network whereby the conductive condition of said second asymmetric means is controlled, each said timing device of said interpulse timing network having two timing intervals, said timing intervals of said timing devices in said interpulse timing network being such that its time-rate interval for rendering its respectively associated said asymmetric device nonconducting is less than its time-rate for rendering its respectively associated said asymmetric device conducting, each said timing device of said interpulse timing network comprising a first and a second electric valve, each said valve having a pair of main electrodes and a control electrode and an anode circuit, said anode circuits associated with said first valve including a chargeable element and a discharge device for said element, said chargeable element being associated with its respective said anode circuit so that it is charged as a consequence of current flowing between the main electrodes of the said first valve with which it is associated, each said second valve having an anode circuit including an energizable means for controlling the respective said timing device, each said timing device including a potential applying circuit having an output connected between said control electrode and one of said main electrodes of its respective second valve and having an input controlled by the potential appearing across its respective said chargeable element.

30. In a network for supplying electrical energy from an alternating potential source to a load, comprising in combination, a pair of alternately energizable elements synchronized with said source, an interpulse timing network including a pair of timing devices to be energized with an alternating potential, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting said load to a source of electrical energy, said load current network including a first and a second asymmetric current conducting means, said first asymmetric means being connected to conduct current to said load in a first direction, said second asymmetric means being connected to conduct current to said load in a second direction, each of said asymmetric means including a control device for controlling its current conducting condition, a third circuit connecting said control device of said first asymmetric means to said one timing device of said interpulse timing network whereby the conductive condition of said first asymmetric means is controlled, a fourth circuit connecting said control device of said second asymmetric means to said other timing device of said interpulse timing network whereby the conductive condition of said second asymmetric means is controlled, each said timing device of said interpulse timing network having two timing intervals, said timing intervals of said timing devices in said interpulse timing network being such that its time-rate interval for rendering its respectively associated said asymmetric device non-conducting is less than its time-rate for rendering its respectively associated said asymmetric device conducting, each said timing device of said interpulse timing network comprising a first and a second electric valve, each said valve having a pair of main electrodes and a control electrode and an anode circuit, said first valves being polarized from said potential to conduct in opposite half cycles of said potential from their respective said second valve, said anode circuits associated with said first valves including a chargeable element and a discharge device for said element, said chargeable element being associated with its respective said anode circuit so that it is charged as a consequence of current flowing between the main electrodes of the said first valve with which it is associated, each said second valve having an anode circuit including an energizable means for controlling the respective said timing device, each said timing device including a potential applying circuit having an output connected between said control electrode and one of said main electrodes of its respective second valve and having an input controlled by the potential appearing across its respective said chargeable element.

31. In a network for supplying electrical energy to a load from a polyphase supply of alternating potential, comprising in combination, a pair of alternately energizable elements, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting said load to a source of electric energy, said load current network including a pair of asymmetric current controlling units connected between each of the phases of such alternating potential supply and said load, a first asymmetric unit of each of said pair of units being polarized to conduct current to said load in a first direction, a second asymmetric unit of each of said pair of units being polarized to conduct current to said load in a second direction, said load current controlling network further including a first and a second biasing means for controlling the conductive condition of each of said asymmetric units, a third circuit connecting said first biasing means to said one timing device of said interpulse timing network whereby the conductive condition of said first asymmetric unit is controlled in timed relationship to the energization of one of said alternately energized elements, a fourth circuit connecting said second biasing means to said other timing device whereby the conductive condition of said second asymmetric unit is controlled in timed relationship to the energization of the other of said alternately energized elements, said first biasing means including a control device individual to each of said first asymmetric units, said second biasing means including a control device individual to each of said second asymmetric units, said third circuit being connected to the one of said first biasing means which is associated with the first-to-be-controlled of said first asymmetric units, said control devices of said first biasing means being connected in a circuit including means for causing sequential operation of each of said control devices of said first biasing means as a consequence of the operation of said first-to-be-controlled one of said control devices said causing means including a signal transmitting circuit interconnecting each said preceding one of said control devices of said first biasing means with the next succeeding one of said just-mentioned devices, said fourth circuit being connected to the one of said second biasing means which is associated with the first-to-be-controlled of said second asymmetric units, and said control devices of said second biasing means being connected in a circuit including means for causing sequential operation of said control devices of said second biasing means as a consequence of the operation of said first-to-be-controlled one of said control devices in said second biasing means, said last-named causing means including a signal transmitting circuit interconnecting each said preceding one of said control devices of said second biasing means with the next succeeding one of said just-mentioned devices.

32. In a network for supplying electrical energy to a load from a polyphase supply of alternating potential, comprising in combination, a pair of alternately energizable elements, an interpulse timing network including a pair of timing devices, a first circuit interconnecting one of said interpulse timing devices for actuation by one of said alternately energizable elements, a second circuit interconnecting the other of said interpulse timing devices for actuation by the other of said alternately energizable elements, a load current controlling network interconnecting such load to a source of electric energy, said load current network including a pair of asymmetric current controlling units connected between each of the phases of such alternating potential supply and said load, a first asymmetric unit of each of said pair of units being polarized to conduct current to said load in a first direction, a second asymmetric unit of each of said pair of units being polarized to conduct current to said load in a second direction, said load current controlling network further including a first and a second biasing means for controlling the conductive condition of each of said asymmetric units, a third circuit connecting said first biasing means to said one timing device of said interpulse timing network whereby the conductive condition of said first asymmetric unit is controlled in timed relationship to the energization of one of said alternately energized elements, a fourth circuit connecting said second biasing means to said other timing device whereby the conductive condition of said second asymmetric unit is controlled in timed relationship to the energization of the other of said alternately energized elements, said first biasing means including a control device individual to each of said first asymmetric units, said second biasing means including a control device individual to each of said second asymmetric units, said third circuit being connected to the one of said first biasing means which is associated with the first-to-be-controlled of said first asymmetric units, said control devices of said first biasing means being connected in a circuit including means for causing sequential operation of each of said control devices of said first biasing means as a consequence of the operation of said first-to-be-controlled one of said control devices, said causing means including a signal transmitting circuit interconnecting each said preceding one of said control devices of said first biasing means with the next succeeding one of said just-mentioned devices, said fourth circuit being connected to the one of said second biasing means which is associated with the first-to-be-controlled of said second asymmetric units, and said control devices of said second biasing means being connected in a circuit including means for causing sequential operation of each of said control devices of said second biasing means as a consequence of the operation of said first-to-be-controlled one of said control devices in said second biasing means, said last-named causing means including a signal transmitting circuit interconnecting each said preceding one of said control devices of said second biasing means with the next succeeding one of said just-mentioned devices, said biasing means control devices comprising electric discharge devices having anode circuits including energizable devices, said anode circuits being supplied from a polyphase phase shifting circuit connected to supply potential to said anode circuits whereby the time in the supply voltage waves at which said asymmetric units conduct may be determined.

References Cited in the file of this patent

UNITED STATES PATENTS

| | | |
|---|---|---|
| 2,356,859 | Leathers et al. | Aug. 29, 1944 |
| 2,431,083 | Sciaky | Nov. 18, 1947 |
| 2,474,867 | Sciaky | July 5, 1949 |
| 2,600,519 | Solomon | June 17, 1952 |
| 2,614,240 | Bivens | Oct. 14, 1952 |